(12) United States Patent
Satavalekar et al.

(10) Patent No.: US 11,212,539 B2
(45) Date of Patent: Dec. 28, 2021

(54) EFFICIENT LOSSLESS COMPRESSION OF CAPTURED RAW IMAGE INFORMATION SYSTEMS AND METHODS

(71) Applicant: NVIDIA Corporation, Santa Clara, CA (US)

(72) Inventors: Sarvesh Satavalekar, Pune (IN); Gordon Grigor, San Francisco, CA (US); Vinayak Pore, Pune (IN); Gajanan Bhat, San Jose, CA (US); Mohan Nimaje, Pune (IN); Soumen Dey, Pune (IN); Sameer Gumaste, Pune (IN)

(73) Assignee: NVIDIA Corporation, Santa Clara, CA (US)

( * ) Notice: Subject to any disclaimer, the term of this patent is extended or adjusted under 35 U.S.C. 154(b) by 581 days.

(21) Appl. No.: 16/048,120

(22) Filed: Jul. 27, 2018

(65) Prior Publication Data
US 2019/0082185 A1 Mar. 14, 2019

Related U.S. Application Data
(60) Provisional application No. 62/538,577, filed on Jul. 28, 2017.

(51) Int. Cl.
*H04N 19/182* (2014.01)
*G06T 7/11* (2017.01)
(Continued)

(52) U.S. Cl.
CPC ............ *H04N 19/182* (2014.11); *G06N 3/02* (2013.01); *G06T 7/11* (2017.01); *H04N 1/413* (2013.01);
(Continued)

(58) Field of Classification Search
None
See application file for complete search history.

(56) References Cited

U.S. PATENT DOCUMENTS 8,358,704 B2    1/2013  Shi et al.
9,438,799 B2    9/2016  Newman
(Continued)

OTHER PUBLICATIONS

Chin Chye Koh, Student Member, IEEE, Jayanta Mukherjee, Member, IEEE, and Sanjit K. Mitra, Life Fellow, IEEE, New Efficient Methods of Image Compression in Digital Cameras with Color Filter Array, IEEE Transactions on Consumer Electronics, vol. 49, No. 4, Nov. 2003, 9 pages.

(Continued)

*Primary Examiner* — David Perlman
(74) *Attorney, Agent, or Firm* — Shook, Hardy & Bacon L.L.P.

(57) ABSTRACT

Systems and methods for efficient lossless compression of captured raw image information are presented. A method can comprise: receiving raw image data from an image capture device, segregating the pixel data into a base layer portion and an enhanced layer portion, reconfiguring the base layer portion expressed in the first color space values from a raw capture format into a pseudo second color space compression mechanism compatible format, and compressing the reconfigured base layer portion of first color space values. The raw image data can include pixel data are expressed in first color space values. The segregation can be based upon various factors, including a compression benefits analysis of a boundary location between the base layer portion and enhanced layer portion. The reconfiguring the base layer portion can include separating the base layer portion based upon multiple components within the raw data; and forming base layer video frames from the multiple components.

21 Claims, 24 Drawing Sheets

(51) Int. Cl.
  *G06N 3/02* (2006.01)
  *H04N 19/33* (2014.01)
  *H04N 19/186* (2014.01)
  *H04N 1/64* (2006.01)
  *H04N 9/67* (2006.01)
  *H04N 1/413* (2006.01)

(52) U.S. Cl.
  CPC ............... *H04N 1/64* (2013.01); *H04N 9/67* (2013.01); *H04N 19/186* (2014.11); *H04N 19/33* (2014.11)

(56) References Cited

U.S. PATENT DOCUMENTS

| | | |
|---|---|---|
| 9,489,659 B1 | 11/2016 | Liu et al. |
| 9,818,169 B2 | 11/2017 | Campbell et al. |
| 2011/0026591 A1 | 2/2011 | Bauza et al. |
| 2011/0273622 A1 | 11/2011 | Ngo et al. |
| 2015/0124863 A1 | 5/2015 | Ben Natan |
| 2015/0213575 A1* | 7/2015 | Ota ..................... G09G 3/2003 345/591 |
| 2016/0019675 A1 | 1/2016 | Kamimura et al. |
| 2017/0028935 A1* | 2/2017 | Dutta ..................... B60R 11/04 |
| 2017/0104974 A1* | 4/2017 | Bak ........................ H04N 19/61 |
| 2017/0177227 A1* | 6/2017 | Zhang ................... G06F 3/0673 |

OTHER PUBLICATIONS

Ning Zhang and Xiaolin Wu, Lossless Compresson of Color Mosaic Images, Department of Electrical and Computer Engineering, McMaster University, Hamilton, Ontario, Canada L8S 4K1, 2004 International Conference on Image Processing (ICIP), 4 pages.

Hu Chen, Mingzhe Sun and Eckehard Steinbach, Low-Complexity Bayer-Pattern Video Compression using Distributed Video Coding, http://spie.org/Publications/Proceedings/Paper/10.1117/12.807273, Media Technology Group, Institute for Communication Networks, Technische Universitat Munchen, Germany, Jan. 19, 2009, 8 pages.

International Search Report and Written Opinion received for PCT Patent Application No. PCT/US2018/044418, dated Nov. 15, 2018, 11 pages.

International Preliminary Report on Patentability received for PCT Patent Application No. PCT/US2018/044418, dated Feb. 6, 2020, 10 pages.

* cited by examiner

| 311  | 321 | 331  | 341 |
| C1   | L   | C1   | L   |
| 312  | 322 | 332  | 342 |
| L    | C2  | L    | C2  |
| 313  | 323 | 333  | 343 |
| C1   | L   | C1   | L   |
| 314  | 324 | 334  | 344 |
| L    | C2  | L    | C2  |

| 611 RED (Bits 0 - 11) | 612 CLEAR (Bits 0 - 11) | 613 RED (Bits 0 - 11) | 614 CLEAR (Bits 0 - 11) |
|---|---|---|---|
| 621 CLEAR (Bits 0 - 11) | 622 BLUE (Bits 0 - 11) | 623 CLEAR (Bits 0 - 11) | 624 BLUE (Bits 0 - 11) |
| 631 RED (Bits 0 - 11) | 632 CLEAR (Bits 0 - 11) | 633 RED (Bits 0 - 11) | 634 CLEAR (Bits 0 - 11) |
| 641 CLEAR (Bits 0 - 11) | 642 BLUE (Bits 0 - 11) | 643 CLEAR (Bits 0 - 11) | 644 BLUE (Bits 0 - 11) |

FIG. 6

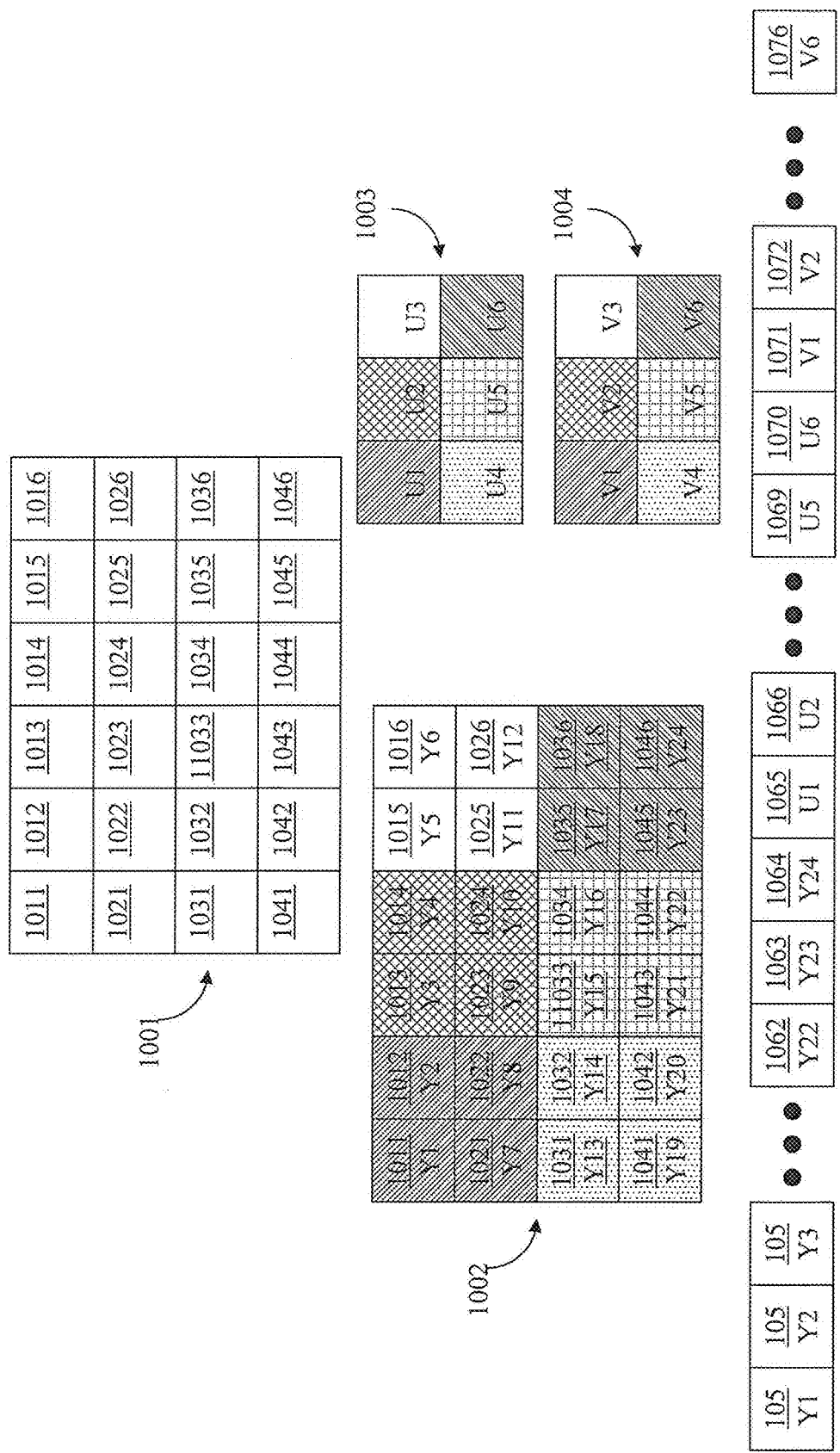

Compression Input Stream 1191 in YUV 444 Format

Frame 1192

| 1151 | 1152 | 1153 | 1154 | 1155 | 1156 | 1157 | 1158 | 1159 | 1160 | 1161 | 1162 |
|------|------|------|------|------|------|------|------|------|------|------|------|
| Y1   | Y2   | Y3   | Y4   | U1   | U2   | U3   | U4   | V1   | V2   | V3   | V4   |

Frame 1193

| 1163 | 1164 | 1165 | 1166 | 1167 | 1168 | 1169 | 1170 | 1171 | 1172 | 1173 | 1174 |
|------|------|------|------|------|------|------|------|------|------|------|------|
| Y5   | Y6   | Y7   | Y8   | U5   | U6   | U7   | U8   | V5   | V6   | V7   | V8   |

Compression Input Stream 1180 in Pseudo YUV 444 Format

Frame 1131

| 1151 | 1152 | 1153 | 1154 | 1155 | 1156 | 1157 | 1158 | 1159 | 1160 | 1161 | 1162 |
|------|------|------|------|------|------|------|------|------|------|------|------|
| CL1  | CL2  | CL3  | CL4  | R1   | R2   | R3   | R4   | (0)  | (0)  | (0)  | (0)  |

Pseudo Y 1181 ; Pseudo U 1182 ; Pseudo V 1183

Frame 1132

| 1163 | 1164 | 1165 | 1166 | 1167 | 1168 | 1169 | 1170 | 1171 | 1172 | 1173 | 1174 |
|------|------|------|------|------|------|------|------|------|------|------|------|
| CL5  | CL6  | CL7  | CL8  | B1   | B2   | B3   | B4   | (0)  | (0)  | (0)  | (0)  |

Pseudo Y 1187 ; Pseudo U 1188 ; Pseudo V 1189

FIG 11B

| Compression Input Stream 2190 in YUV 444 Format |||||||||||||||||||||||
|---|---|---|---|---|---|---|---|---|---|---|---|---|---|---|---|---|---|---|---|---|---|---|
| Frame 2191 |||||||| Frame 2192 |||||||| ... | Frame 2191 |||| Frame 2192 ||||
| 2151 | 2152 | 2153 | 2154 | 2155 | 2156 | 2157 | 2158 | 2159 | 2160 | 2161 | 2162 | 2163 | 2164 | 2165 | 2166 | | 2167 | 2168 | 2169 | 2170 | 2171 | 2172 | 2173 | 2174 |
| Y1 | Y2 | Y3 | Y4 | Y5 | Y6 | Y7 | Y8 | U1 | U2 | U3 | U4 | U5 | U6 | U7 | U8 | | V1 | V2 | V3 | V4 | V5 | V6 | V7 | V8 |

| Compression Input Stream 2180 in Pseudo YUV 444 Format |||||||||||||||||||||||
|---|---|---|---|---|---|---|---|---|---|---|---|---|---|---|---|---|---|---|---|---|---|---|
| Frame 2131 |||| Frame 2132 |||| Frame 2131 |||| Frame 2132 |||| ... | Frame 2131 |||| Frame 2132 ||||
| 2151 | 2152 | 2153 | 2154 | 2155 | 2156 | 2157 | 2158 | 2159 | 2160 | 2161 | 2162 | 2163 | 2164 | 2165 | 2166 | | 2167 | 2168 | 2169 | 2170 | 2171 | 2172 | 2173 | 2174 |
| CL1 | CL2 | CL3 | CL4 | CL5 | CL6 | CL7 | CL8 | R1 | R2 | R3 | R4 | B15 | B2 | B3 | B4 | | (0) | (0) | (0) | (0) | (0) | (0) | (0) | (0) |
| Pseudo Y 2181 |||| Pseudo Y 2187 |||| Pseudo U 2182 |||| Pseudo U 2183 |||| | Pseudo V 2183 |||| Pseudo V 2189 ||||

FIG 11C

| 1251 | 1252 | 1253 | 1254 | 1255 | 1256 | 1257 | 1258 | 1259 | 1260 | 1261 | 1262 | 1263 | 1264 | 1265 | 1266 | 1267 | 1268 | 1269 | 1270 | 1271 | 1272 | 1273 | 1274 |
|---|---|---|---|---|---|---|---|---|---|---|---|---|---|---|---|---|---|---|---|---|---|---|---|
| Y1 | Y2 | Y3 | Y4 | Y5 | Y6 | Y7 | Y8 | Y9 | Y10 | Y11 | Y12 | Y13 | Y14 | Y15 | Y16 | U1 | U2 | U3 | U4 | V1 | V2 | V3 | V4 |

Compression Input Stream 1291 in YUV 420 Format

| 1251 | 1252 | 1253 | 1254 | 1255 | 1256 | 1257 | 1258 | 1259 | 1260 | 1261 | 1262 | 1263 | 1264 | 1265 | 1266 | 1267 | 1268 | 1269 | 1270 | 1271 | 1272 | 1273 | 1274 |
|---|---|---|---|---|---|---|---|---|---|---|---|---|---|---|---|---|---|---|---|---|---|---|---|
| CL1 | CL2 | CL3 | CL4 | CL5 | CL6 | CL7 | CL8 | R1 | R2 | R3 | R4 | B1 | B2 | B3 | B4 | (0) | (0) | (0) | (0) | (0) | (0) | (0) | (0) |

Compression Input Stream 1292 in Pseudo YUV 420 Format

Pseudo Y 1281　　Pseudo U 1282　　Pseudo V 1283

FIG 12B

| 1351' | 1352' | 1353' | 1354' | 1355' | 1356' | 1357' | 1358' | 1359' | 1360' | 1361' | 1362' | 1263' | 1364' | 1365' | 1366' |
|---|---|---|---|---|---|---|---|---|---|---|---|---|---|---|---|
| Y1 | Y2 | Y3 | Y4 | Y5 | Y6 | Y7 | Y8 | Y9 | Y10 | U1 | U2 | U3 | V1 | V2 | V3 |

Compression Input Stream 1391 in YUV 444 Format

| 1351 | 1352 | 1353 | 1354 | 1355 | 1356 | 1357 | 1358 | 1359 | 1360 | 1361 | 1362 | 1363 | 1364 | 1365 | 1366 |
|---|---|---|---|---|---|---|---|---|---|---|---|---|---|---|---|
| CL1 | CL2 | CL3 | CL4 | CL5 | CL6 | CL7 | CL8 | R1a/R2a | B1a/B2a | R1b/R2b | R3 | R4 | B1b/B2b | B3 | B4 |

Compression Input Stream 1392 in Pseudo YUV 444 Format

Pseudo Y 1381    Pseudo U 1382    Pseudo V 1383

FIG 13B

| 1451 | 1452 | 1453 | 1454 | 1455 | 1456 | 1457 | 1458 | 1459 | 1460 | 1461 | 1462 | 1463 | 1464 | 1465 | 1466 |
|------|------|------|------|------|------|------|------|------|------|------|------|------|------|------|------|
| Y1 | Y2 | Y3 | Y4 | Y5 | Y6 | Y7 | Y8 | U1 | U2 | U3 | U4 | V1 | V2 | V3 | V4 |

Compression Input Stream 1491 in YUV 422 Format

| 1451 | 1452 | 1453 | 1454 | 1455 | 1456 | 1457 | 1458 | 1459 | 1460 | 1461 | 1462 | 1463 | 1464 | 1465 | 1466 |
|------|------|------|------|------|------|------|------|------|------|------|------|------|------|------|------|
| CL1 | CL2 | CL3 | CL4 | CL5 | CL6 | CL7 | CL8 | R1 | R2 | R3 | R4 | B1 | B2 | B3 | B4 |
| Pseudo Y 1481 | | | | | | | | Pseudo U 1482 | | | | Pseudo V 1483 | | | |

Compression Input Stream 1492 in Pseudo YUV 422 Format

FIG 14B

1600
1610
Raw capture image information is received from an image capture device
1620
The pixel data is segregated into a base layer portion and an enhanced layer portion.
1630
The base layer portion is reconfigured into base layer compression input data.
1640
The reconfigured base layer portion is compressed.
1650
The raw capture image information is stored.
FIG 16

EFFICIENT LOSSLESS COMPRESSION OF CAPTURED RAW IMAGE INFORMATION SYSTEMS AND METHODS

RELATED APPLICATIONS

This application claims benefit of and priority to U.S. Provisional Patent Application No. 62/538,577, entitled "Efficient Lossless Compression for Autonomous Driving Training Data to Reduce Storage Size and Storage Write Speed Requirement" filed Jul. 28, 2017, which is incorporated herein by reference.

FIELD OF THE INVENTION

Embodiments of the present invention relate to the field of information storage. In one embodiment, systems and methods facilitate efficient compression of information.

BACKGROUND

Numerous electronic technologies such as digital computers, video equipment, and telephone systems are used to increase productivity and reduce costs associated with processing information in numerous areas of business, science, and entertainment. There are a number of these applications that involve the capture and storage of large amounts of raw video or image information (e.g., for historical reasons, for subsequent analysis, etc.). Accurate and fast storage of information are typically important for proper processing and utilization of the information. However, there are a number of factors that can impact information storage, such as limitations on storage access speed and capacity.

Storing large amounts of data can be problematic and costly. Storing large amounts of data usually requires significant storage resources. However, storage resources are often limited by various factors such as costs, form factor of the device, space, power supply, and so on. Storage operations associated with large amounts of data can also take a relatively long time. Data compression techniques are sometimes used to overcome these limitations. However, data compression can also be complicated and costly. There can be significant costs associated with developing and implementing compression encoding and decoding systems and methods. Conventional data compression approaches often try to reduce complications and costs by implementing lossy compression techniques. Unfortunately, in lossy compression some of the original raw captured information is lost or distorted during processing. Conventional attempts at lossless compression are typically limited (e.g., some require an additional bit be added to the data due to color space conversion which in effect adversely impact the compression ratio, etc.).

Large datasets of information are utilized in a variety of areas or fields such as medical imaging, national security, autonomous vehicles, interactive video analysis, and so on. Due to the nature of these applications there is a need for very accurate lossless and rapid information storage. Lossless compression is where information retrieved from storage can be decoded and recreated to be the same as the original raw captured data before storage without mismatches or lost information. Compression techniques that are considered perceptually lossless may not be sufficient. In many situations a user is interested in lossless compression encoding even if it doesn't give high compression ratios.

SUMMARY

Systems and methods for efficient lossless compression of captured raw image information are presented.

Image information received from a camera or image sensor is separated into two parts or portions. One part of the image information is rearranged and compressed, then stored in a memory. The other part is stored in memory without being rearranged or compressed. In one exemplary implementation, part of original image values captured by a camera or sensor are compressed and stored as a base portion, and part of the original image values are not compressed and stored as an enhancement portion. The base portion values can be rearranged or reconfigured to be compatible with efficient compression techniques. The storage of an uncompressed enhanced portion and a compressed base portion of the original image values enables efficient and effective lossless and accurate storage of information in less space than conventional systems. The rearrangement being compatible with efficient compression techniques enables the information to be compressed conveniently and faster than traditional approaches.

In one embodiment, original information associated with an image or picture is collected and arranged in a first configuration or format. The information can include types of color values (e.g., red (R), blue (B), green (G), clear (C), etc.). The information is rearranged into a second configuration. The second configuration includes separating the image information into a base portion that is easily compressed (e.g., tends to have repeated or redundant values, etc.) and an enhanced portion that is not as easily compressed (e.g., tends to have unique or fewer repeated values, etc.). The color values in the enhanced portion are stored in memory. The color values (e.g., R, B, G, C) in the base portion are further rearranged fit into a third configuration. The third configuration can be compatible or associated with a type of compression (e.g., H.264, H.265, Av1, etc.). In one example, the third configuration can have slots or position similar to a configuration for other types of color values (e.g., YUV, luma, chroma, etc.) but different than traditional configurations or formats. The third configuration slots or positions are filled with the original type of color values (e.g., red (R), blue (B), green (G), clear (C), etc.) instead of the other types of color values (e.g., YUV, luma, chroma, etc.). The third configuration color values from the base portion are compressed and stored in memory.

In one embodiment a method comprises: receiving raw image data from an image capture device, wherein the raw image data includes pixel values expressed in first color space values, segregating the pixel values into a base layer portion and an enhanced layer portion, reconfiguring the base layer portion of the pixel values as a pseudo color expression, wherein the pseudo color space expression is compatible with a second color space compression format, and compressing the reconfigured base layer portion pseudo color space expression. The segregation can be based upon various factors, including a compression benefits analysis of a boundary location between the base layer portion and the enhanced layer portion. Reconfiguring the base layer portion can include separating the base layer portion based upon multiple components within the raw data and forming base layer video frames from the multiple components. The raw image data can be in a Red, Clear, Clear, Blue (RCCB) format and the reconfigured base layer portion compression input includes red, clear, and blue components that are compatible with a YUV luminance chrominance format. A boundary between the enhancement layer and the base layer can be based upon a balancing of benefits of compressing the information versus the cost of compressing the information. The boundary can be a point at which the benefits of compressing the information outweigh the cost of compressing the information. A base layer portion can include more bits than the enhanced layer portion. The base layer portion can include the most significant bits, with the least significant bits being comprised in the enhanced layer portion. The base layer video frames can be input to H.264 compatible encoder. In one embodiment, the method further comprises training a deep learning network or deep neural network (DNN) for autonomous vehicle applications, wherein the training uses information in the base layer portion and enhanced layer portion.

In one embodiment reconfiguring includes: separating the base layer portion based upon multiple elements within the raw data; forming a base layer video frame from the multiple elements; and arranging information associated with the base layer video frames in a YUV color space compression compatible format. The multiple elements can include a red element, a blue element, a first clear element, and a second clear element collectively corresponding to the pixel values. In one embodiment, arranging the information associated with the base layer video frames in the YUV color space compression compatible format uses the pixel values expressed in the RCCB color space as values in the pseudo YUV color space compression compatible format instead of derived YUV color space values converted from the RCCB color space values. The base layer video frames can include a Clear Blue (CB) video frame (formed by the blue element and the first clear element) and a Clear Red (CR) video frame (formed by the red element and the second clear element). The base layer video frames can correspond to various pseudo YUV formats (e.g., a pseudo YUV444 format, pseudo YUV420 format, etc.). A portion of the base layer video frames can correspond to a pseudo Y component and zero plane frames are utilized as pseudo UV components.

In one embodiment, a first portion of the blue element can correspond to a chrominance U input and a first portion of the red element can corresponds to a chrominance V input, while a second portion of red element, a second portion of the blue element, a first clear element and second clear element can correspond to a luminance Y input. Base layer video frames can be compatible with a pseudo YUV420 format wherein: a pseudo YUV width is equal to an input width; and a pseudo YUV height is equal to (input_height+2)/3*2, wherein input_height is a value indicating the number of pixels in the height of the pseudo YUV component. In one exemplary implementation, a 420 compatible height minus base layer portion compression input divided by 2 is a first quantity of rows from the red element and the blue element that are included in a luminance Y format portion and a second quantity of remaining rows from the red element and the blue element are included in the chrominance U and V format portions.

In one embodiment a system comprises: an image capture device that captures raw image information, wherein the raw image data includes pixel values expressed in a first color space; a processing unit that directs raw captured image information preservation storage operations, wherein a first portion of the pixel values are arranged as a pseudo color expression that is compatible with a second color compression format; and a memory. The memory stores a first portion of pixel values as a compressed version of the pseudo color expression, and a second portion of the pixel values as captured raw image information in a non-compressed format. In one embodiment, the first portion is an enhancement portion and the second portion is a base portion. In one embodiment, the image capture device, the processing unit, and the memory are located in a vehicle, and the raw image information corresponds to scenes encountered during vehicle operation. The memory can be portable and selectively removable from the vehicle

BRIEF DESCRIPTION

The accompanying drawings, which are incorporated in and form a part of this specification and in which like numerals depict like elements, illustrate embodiments of the present disclosure and, together with the description, serve to explain the principles of the disclosure. The drawings are not necessarily to scale unless otherwise indicated.

FIG. 3 is a block diagram of exemplary raw captured image information in accordance with one embodiment.

FIG. 6 is a block diagram of exemplary clear luminance, red first type chrominance, and blue second type chrominance raw captured image information in accordance with one embodiment.

FIG. 10 is a block diagram of conventional YUV 420 format.

FIG. 11B is a block diagram of an exemplary compression input stream in a pseudo YUV 444 format in accordance with one embodiment.

FIG. 11C is a block diagram of another exemplary compression input stream in a pseudo YUV 444 format in accordance with one embodiment.

FIG. 12B is a block diagram of an exemplary compression input stream in a pseudo YUV 444 format in accordance with one embodiment.

FIG. 13B is a block diagram of an exemplary compression input stream in a pseudo YUV 444 format in accordance with one embodiment.

FIG. 14B is a block diagram of an exemplary compression input stream in a pseudo YUV 444 format in accordance with one embodiment.

FIG. 16 is a flow chart of an exemplary method in accordance with one embodiment.

DETAILED DESCRIPTION

Figure 1:
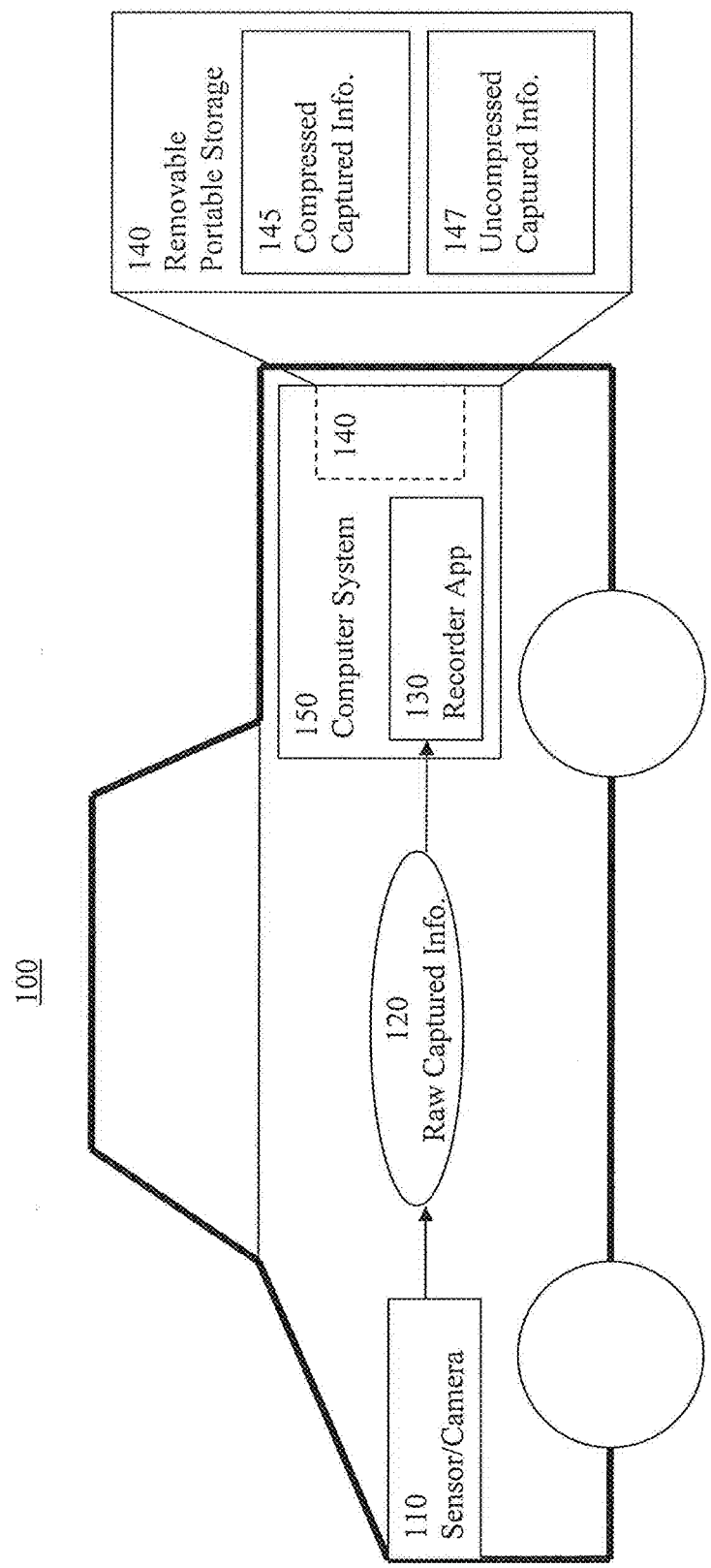
FIG. 1 is a block diagram of an exemplary vehicle system in accordance with one embodiment.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Embodiments of the present systems and methods can facilitate efficient and effective information storage. In one embodiment, captured raw image data is segregated into a base layer portion and an enhanced layer portion, wherein the raw capture values of base layer portion are reconfigured from a raw capture format into a compression encoder input format. The compression encoder input format can include raw captured image information expressed in first color space values that are configured in a pseudo second color space encoder input format. In one exemplary implementation, the segregation into a base layer portion and enhanced layer portion can be based upon various factors (e.g., a compression benefits analysis of the base layer portion, the type of compression scheme, the time it takes to perform compression operations, etc.). The compression can result in reducing the amount of information written to and saved in the storage device compared to the amount of raw captured image information. In one embodiment, the compression is lossless.

In one embodiment, the compression of the raw captured image information is performed in real time before writing to the storage. Performing lossless compression of the raw captured image information can result in reducing the amount of data written to and saved in a storage device. Reducing the amount of data written to storage minimizes bottlenecks associated with the write speed of the storage device and enables real-time, rapid data capture.

In one embodiment, lossless compression is utilized in autonomous vehicle control system development. Autonomous vehicle control systems often involve collections of large, high-quality datasets corresponding to recording information associated with vehicle operations, including huge amounts of captured raw video information. These data sets are typically used for training and verification of deep neural networks designed for autonomous driving. The recorded data can be captured by installing multiple camera sensors on the car. In one exemplary implementation, multiple sensors on a vehicle can be utilized to sense raw captured image information corresponding to a full 360 degree view of the surrounding scene. These sensors can generate large amounts of raw captured image information every second, and the raw captured image information needs to be written to connected storage systems.

FIG. 1 is a block diagram of an exemplary vehicle system 100 in accordance with one embodiment. Vehicle system 100 includes sensor 110, computer system 150, and portable storage device 140. In one embodiment, sensor 110 is an image capture device (e.g., camera, infrared sensor, etc.) that captures raw image information and forwards it to computer system 150. Computer system 150 performs recorder application 130 operations. In one embodiment, the recorder application 130 operations include compression of at least a portion of the captured raw image information. Both the compressed captured raw image information 145 and the uncompressed captured raw image information 147 is stored in a portable storage device 140 (e.g., SSD device, portable hard drive, etc.).

In one embodiment, other information (e.g., speed, distance, time, etc.) associated with vehicle operations can be processed by computer system 150 and stored in portable storage device 140 (not shown). The other information can be associated with or mapped to the raw captured image information.

The portable storage device can be removed from the car and the data can be uploaded from the portable storage device to a remote storage server. Various types of data analytics can be performed on the information stored in the portable storage device. The data can be used by various applications (e.g., artificial intelligence applications, machine learning applications, etc.). The applications can comprise a learning machine (e.g., neural network) having multiple layers and be considered deep (e.g., a deep neural network, etc.). A deep neural network (DNN) for autonomous vehicle applications can be trained using the captured data.

Figure 2:
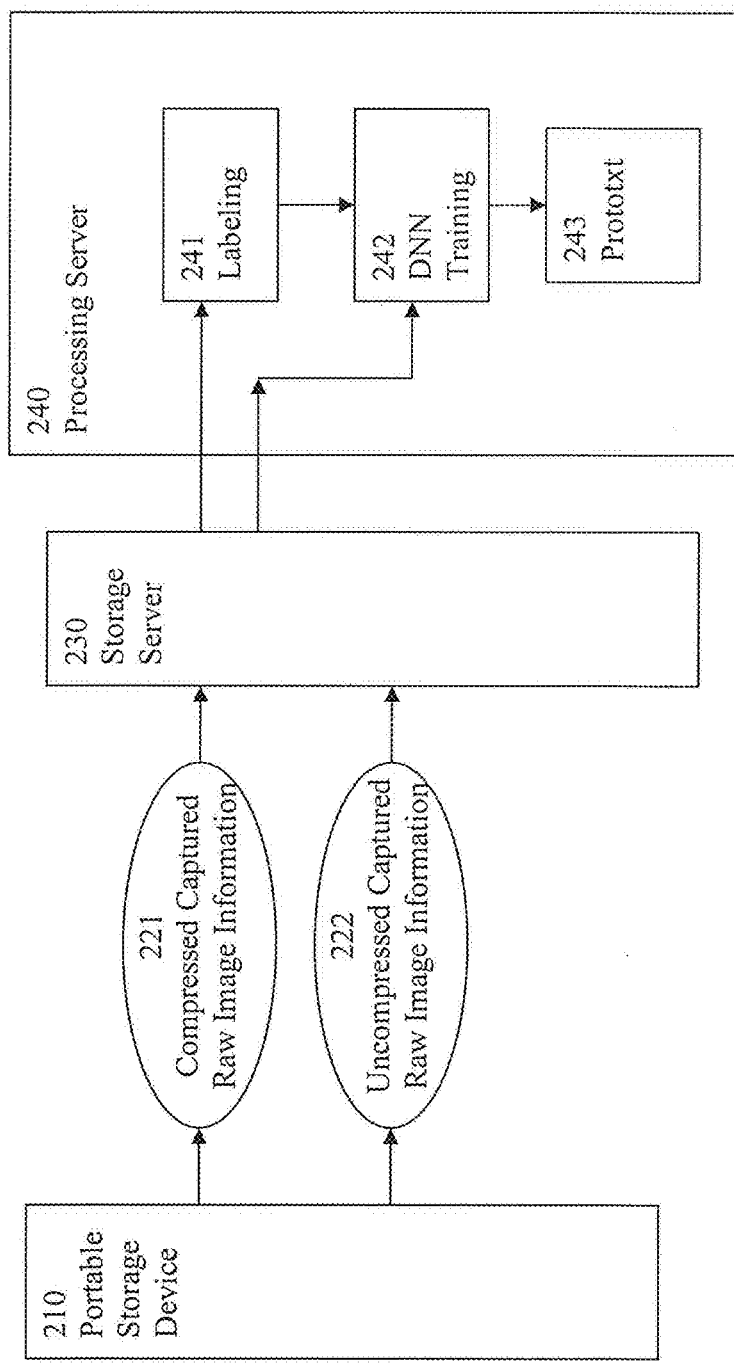
FIG. 2 is block diagram of exemplary information flow and processing associated with DNN training in accordance with one embodiment.

FIG. 2 is a block diagram of exemplary information flow and processing associated with DNN training in accordance with one embodiment. In one embodiment, a portable storage device 210, storage server 230, and processing server 240 are located at a centralized location. Vehicles with systems similar to system 100 that capture raw image information at distributed locations can be remote from the centralized location. Portable storage device 210 can be removed from a vehicle similar to removal of the portable storage device 140 from vehicle 100 and can include compressed raw captured image information similar to portable storage device 140. Compressed raw captured image information 221 is uploaded to storage server 230. The compressed raw captured image information in storage server 230 is retrieved by processing server 240. Non-compressed raw captured image information 222 can also be uploaded to storage server 230 and retrieved by processing server 240. In one exemplary implementation, the compressed captured raw image information is decompressed or decoded by processing server 240 and combined with the non-compressed captured raw image information. Processing server 240 can perform various processing operations including DNN training operations. In one exemplary implementation, video recording information associated with the image of an object can be given an identifying label (e.g., tree, pedestrian, other car, truck, etc.) in a labeling process 241. Both labeled information from labeling process 241 and unlabeled information from storage server 230 can be input to DNN training process 242. The results of DNN training process 242 can be fed into prototxt process 243. In one embodiment, other information (e.g., speed, distance, time, etc.) associated with vehicle operations can be communicated (not shown) to processing server 240 and utilized in various processing operations, including DNN training operations.

It is appreciated that portable storage device 210 and storage server 230 can include other information and processing server 240 can perform other processing in addition to DNN processing. In one embodiment, a single server performs operations of both storage server 230 and processing server 240. In one embodiment, multiple distributed servers perform operations of storage server 230 and multiple distributed servers perform operations of processing server 240.

It is appreciated that DNN training is not necessarily limited to autonomous vehicle control operations. In one embodiment, DNN training is also used in automated product examination and analysis where the observer is a machine. In one exemplary implementation, object details can be captured as raw images and stored for analysis. The captured raw image information is input to a deep learning network. Deep learning networks can be compatible with a variety of sensor raw image capture formats (e.g., Bayer format, BCCR, BGGR, etc.). In one embodiment, camera sensors capture raw image information in Bayer format and the raw image capture information is used as input to processing components of a deep learning network. However, raw captured image information formats are not traditionally compatible with compression input formats.

In one embodiment, a sensing array for color images is used to capture the raw image information. The sensing array can include a plurality of sensing elements. A sensing element can be used to capture the raw image information. In one exemplary implementation, a sensing element or sensel is a combination of a selectively transmissive filter with sensitivity to particular light characteristics and a solid state charge coupled device. Sensitivity to a light characteristic can include sensitivity to a particular color (e.g., blue, red, green, white, clear, etc.).

The sensing elements can be arranged in an array of luminance sensing elements and chrominance sensing elements. In one embodiment, sensed luminance is the color vector which is the major contributor of luminance information from the array and sensed chrominance refers to other color vectors which provide a basis for defining an image. A luminance sensing element is a type of sensing element that is the dominant type of sensing element in the array and a chrominance element is not the dominant type of sensing element in the array. The number of luminance sensing elements is greater than the number of a particular type of chrominance sensing elements. In one embodiment, the total number of different types of chrominance elements can be greater than or equal to the number of luminance sensing elements, as long as the number of each particular type of chrominance sensing elements is less than the luminance sensing elements. In one embodiment, luminance is considered a brightness component and chrominance is considered a color component.

In one embodiment, a mosaic of individually narrow sensing elements can have a relatively broad collective range of light sensitivity. In one embodiment, luminance type elements detect a first color, first chrominance type elements detect a second color, and second type chrominance elements detect a third color. In one embodiment, a raw image information capture array includes green luminance detection elements, red chrominance detection elements, and blue chrominance detection elements. The distribution of filter types in the mosaic is in accordance with the array pattern of luminance sensing elements and chrominance sensing elements. In one embodiment, the luminance elements occur at every other element position to provide a dominant pattern which is uniform in two perpendicular directions (e.g., horizontal and vertical, etc.) with chrominance elements filling the remaining element positions.

In one embodiment, a group of sensing elements correspond to an image pixel. In one exemplary implementation, the sensing elements corresponding to an image pixel includes two luminance sensors, one first type chrominance sensor, and one second type chrominance sensing element. FIG. 3 is a block diagram of exemplary sensels and corresponding raw captured image information 300 in accordance with one embodiment. The sensels include first type chrominance sensed elements 311, 313, 331 and 333, second type chrominance sensed elements 322, 324, 342 and 344, and luminance sensed elements 312, 314, 321, 323, 332, 334, 341, and 343. It can be seen that the luminance sensed elements are more dominant (e.g., occur more frequently) than the first type chrominance sensed elements. The luminance sensed elements are also more dominant (e.g., occur more frequently) than the second type chrominance sensed elements.

Figure 4:
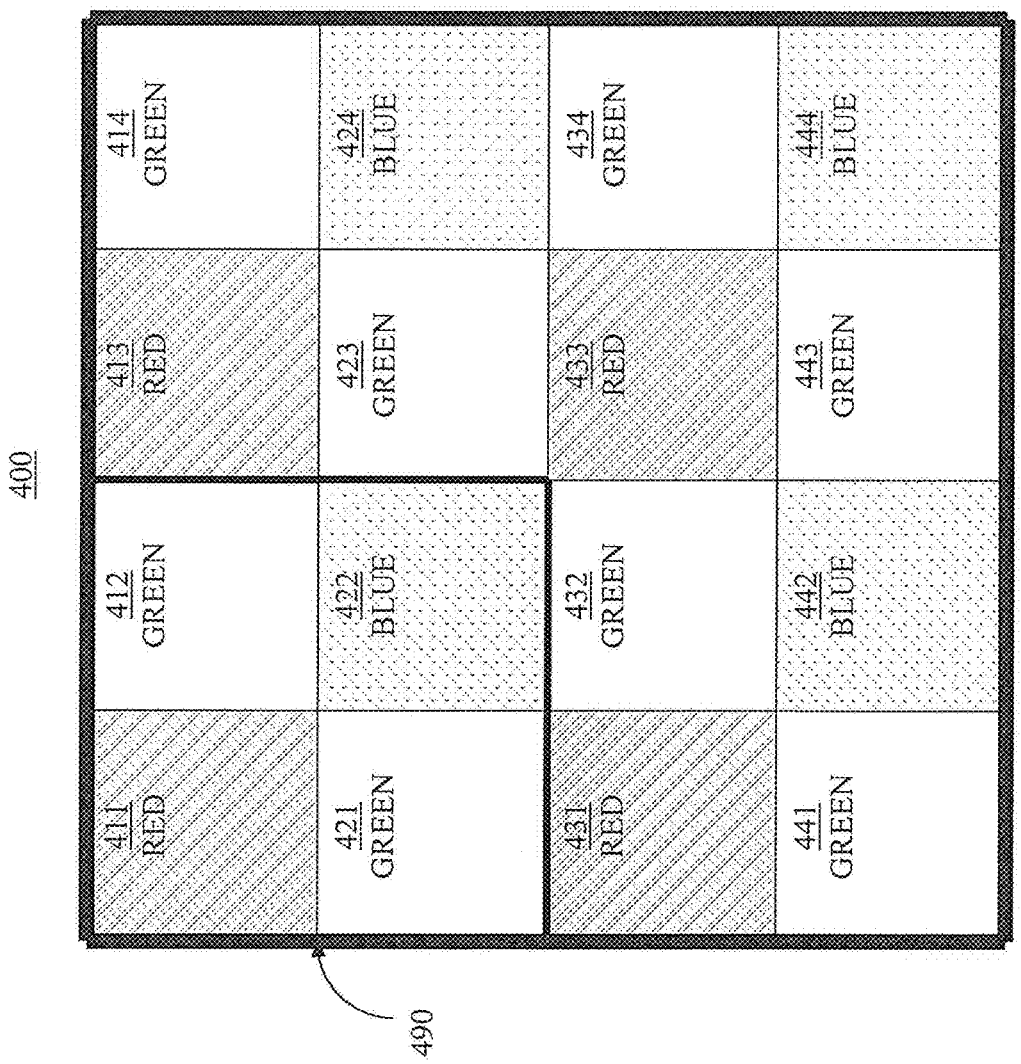
FIG. 4 is a block diagram of exemplary green luminance, red first type chrominance, and blue second type chrominance raw captured image information in accordance with one embodiment.

In one embodiment, a luminance sensing element corresponds to a green light characteristic filter, a first type chrominance sensing element corresponds to a red light characteristic filter, and a second type chrominance sensing element corresponds to a blue light characteristic filter. In one embodiment, the Y, C1, and C2 values in FIG. 3 correspond to green luminance values, red first type chrominance values, and blue second type chrominance values, respectively. FIG. 4 is a block diagram of exemplary green luminance, red first type chrominance, and blue second type chrominance sensels and raw captured image information 400 in accordance with one embodiment. The sensels include red chrominance sensed elements 411, 413, 431 and 433, blue chrominance sensed elements 422, 424, 442 and 444, and green sensed elements 412, 414, 421, 423, 432, 434, 441, and 443. In one exemplary implementation, the mosaic of green luminance, red first type chrominance, and blue second type chrominance sensel corresponds to a red/green/green/blue (RGGB) image pixel array. In one embodiment, for each RGGB image pixel there are two green luminance sensed elements, one red first type chrominance sensed element, and one blue second type chrominance sensed element. In one exemplary implementation, red chrominance sensed element 411, blue chrominance sensed element 422, and green sensed elements 412 and 421 form an image pixel 490.

There is typically a very large amount of captured raw image information produced by sensing elements. In one exemplary use case, there are multiple camera sensors (3, 6, 8, etc.) capturing data in 12 bit Bayer format (RCCB/RGGB) in real time which needs to be stored in a lossless format. In one embodiment, 6 camera sensors capture a 1080 pixel input signal (1920×1080, 16 bit Bayer format) at rate of 30 frames per second. In one exemplary implementation, the amount of data generated per second is equal to 746 MB (1920×1080×2×30×6). Thus, one hour of continuous capture generates approximately 2.5 TB of data. In one embodiment, compression is used to reduce the amount of information. A video codec using a compression factor of 2.5 reduces the size from 2.5 TB to 1 TB. This compression can help to reduce storage space, increase duration of capture session, reduce bandwidth cost, or even increase the number of sensors to capture more details.

Figure 5:
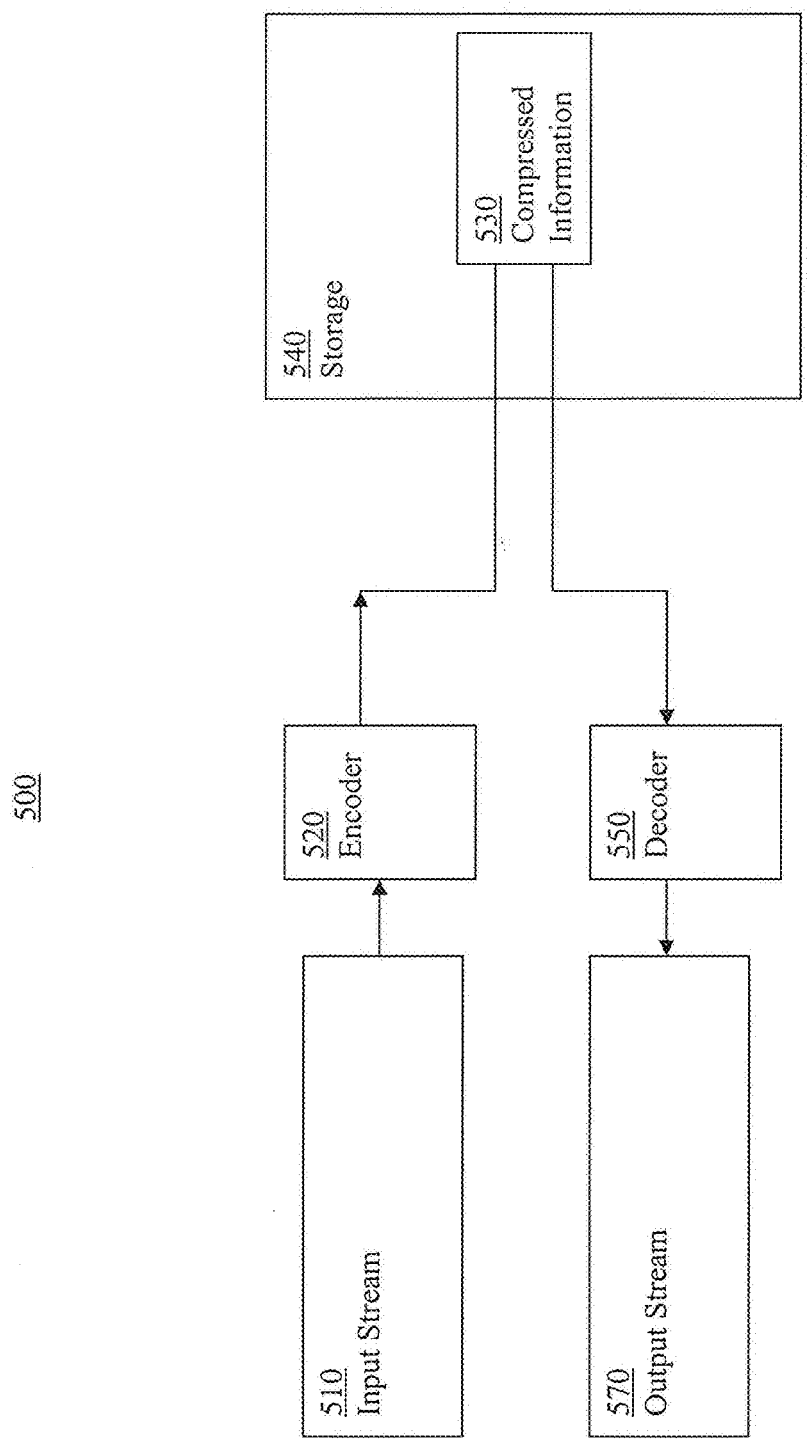
FIG. 5 is a block diagram of an exemplary compression component input and output information flow in accordance with one embodiment.

FIG. 5 is a block diagram of an exemplary compression pipeline information flow in accordance with one embodiment. Input stream 510 is fed into compression encoder 520 which performs compression operations on the information of input stream 510 and outputs compressed information 530. The compressed information 530 is stored in storage component 540 during a write operation. The compressed information 530 can be retrieved from the storage component 540 and during a read operation and input to decoder 550. Decoder 550 performs decompression operations on the information of compressed information 530 and outputs stream 570. In one embodiment of lossless encoding/decoding operations, the input stream 510 and output stream 570 include the same information. In one embodiment, sensed element raw captured image values are input to compression encoder 520.

Encoder performance is important for use cases where real time capture is required. There are also use cases where multiple encode capture sessions run simultaneously and there is a need for very fast encoding. Encoding is typically more processing intensive than decoding. Thus, it is important to choose encoder features carefully. There are several factors that can be considered in selecting a compression encoding scheme and features.

In one embodiment, redundancy of raw captured image information duplication is utilized by compression operations to reduce the amount of information. There are several types of redundancy that can be used, such as spatial redundancy intra-frame compression, temporal redundancy inter-frame redundancy, and so on. Inter frame compression typically provides better compression efficiency as an encoder can exploit temporal redundancy in the frames. Intra-frame compression encodes a frame independently without using references from other frames, enabling intra-frames to be randomly accessed without decoding a sequence of frames.

In one embodiment, the number of input source symbols encoded or mapped to the number of output symbols or bits impacts loss/distortion of the information retrieved from storage. In fixed length encoding, a fixed number of source symbols are encoded to a fixed number of output symbols. Fixed length encoding can be susceptible to information loss. Variable length coding maps a source symbol to a variable number of bits. In one exemplary implementation, variable length encoding enables the sources to be read back from storage symbol by symbol with no information loss.

In conventional approaches variable length coding can be a bottleneck in lossless encoding. In one embodiment, context-adaptive variable-length coding (CAVLC) processing is faster than context-based adaptive binary arithmetic coding (CABAC). In one embodiment, greater compression ratios can be achieved with CABAC. In one exemplary implementation, CABAC is utilized when compression efficiency is more important than processing speed, and CAVLC is utilized when processing speed is more important than compression ratios. In one embodiment, CAVLC is utilized to keep up with rapid processing requirements associated large amounts of information captured from multiple sensors that needs to be processed in real time.

In one embodiment, some codec features are not required. A lossless preservation system and method does not include quantization features that would other-wise introduce problems associated with lossy compression. In one embodiment transform operations that do not contribute much to compression ratios can be bypassed as well.

It is appreciated that various numbers of bits can be used to express the sensed element raw captured image values. It is often important in various applications (e.g., autonomous vehicles, medical procedures, security systems, etc.) for image capture information to be very accurate and granular. Utilizing larger numbers of bits to express the sensed element raw captured image values can provide greater accuracy and granularity. However, utilizing larger numbers of bits to express the sensed element raw captured image values can increase encoding processing and complexity significantly, with the result of slowing down encoding operations compared to smaller number of compression input bits. In one embodiment, a larger bit compression or codec input requires advance encoder profiles and it can be difficult to get real time performance with a larger bit encoder.

In one embodiment, a sensed element raw captured image value is expressed as 12 bits. The 12 bit values are associated with sense elements in a mosaic corresponding to a red/clear/clear/blue (RGGB) image pixel array. In one embodiment, for each RCCB image pixel there are two clear luminance sensed elements, one red first type chrominance sensed element, and one blue second type chrominance sensed element. FIG. 6 is a block diagram of exemplary clear luminance, red first type chrominance, and blue second type chrominance raw captured image information 600 in accordance with one embodiment. The raw captured image information includes red chrominance sensed elements 611, 613, 631, and 633, blue chrominance sensed elements 622, 624, 642, and 644, and clear sensed elements 612, 614, 621, 623, 632, 634, 641, and 643. In one embodiment, 12 bits are used to express each sensed element raw capture image information (e.g., 12 bits are used to express red chrominance sensed element 611, another 12 bits are used to express red chrominance sensed element 613, another 12 bits are used to express blue chrominance sensed elements 624, etc.). In one embodiment, the 12 bits are sufficient for accuracy but challenging for encoders to perform compression processing in a real time environment.

It is appreciated that for image capture applications the least significant bits of each sensel can differ a lot and there may be little or no similarity in these bits. As such, least significant bits do not typically contribute much to redundancy compression or encoding. In one exemplary implementation, the last few bits effectively have an adverse impact on compression ratio results. In one embodiment, least significant bits are handled differently than other bits in the raw capture image information.

In one embodiment, sensed element values are divided into two groups of values. This can be thought of as splitting an input frame into two layers. The first layer is an enhancement layer which contains the least significant bits of a sensel value. The second layer is a base layer which contains the remaining bits of a sensel value. In one embodiment, a base layer includes the most significant 8 bits and enhancement layer includes the least significant 4 bits of each sensel. The enhancement layer can be stored as non-compressed bits of raw capture image information directly in memory without processing through a compression encoder, as there is no or little similarity of redundant values. In one embodiment, a base layer can be utilized as values of an input stream to a compression component. In one embodiment, the base layer can be encoded using a lossless compression technique. In one exemplary implementation, dividing the raw captured image information into a base layer portion and enhanced layer portion facilitates increased speed and encoding performance without losing encoding efficiency.

Figure 7A:
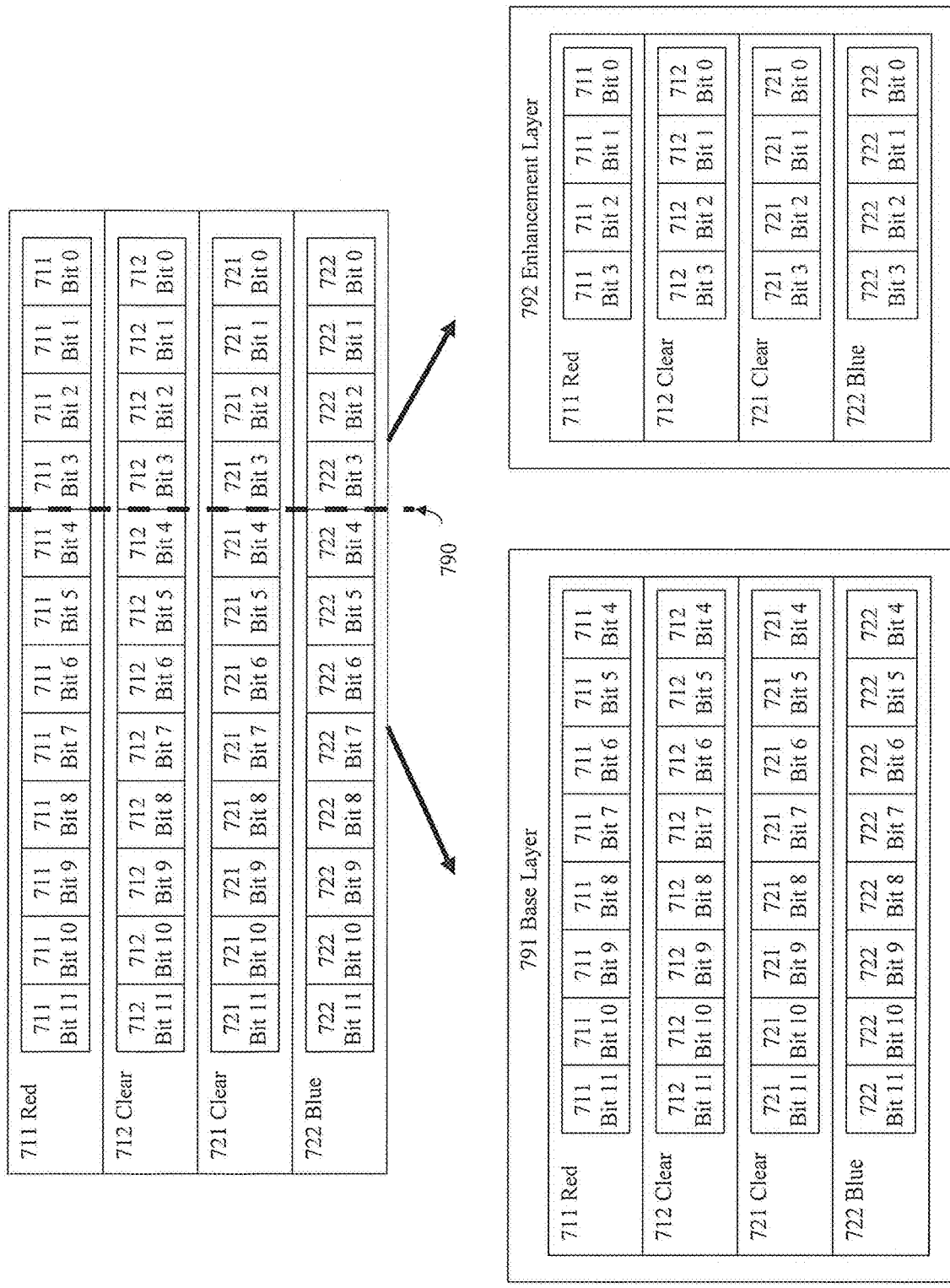
FIG. 7A is a block diagram of an exemplary base/enhancement configuration in accordance with one embodiment.

FIG. 7A is a block diagram of an exemplary base/enhancement layer configuration in accordance with one embodiment. In one embodiment, a pixel includes a red sensing element value 711, a first clear sensing element value 721, a second clear sensing element value 712, and a blue sensing element value 722. The red sensing element value 711, first clear sensing element value 721, second clear sensing element value 721, and blue sensing element value 722 can correspond to red sensing element value 611, first clear sensing element value 612, second clear sensing element value 621, and blue sensing element value 622 in FIG. 6. Each sensing element value 711 through 722 includes 12 bits identified as respective bit 0 through bit 11. Respective bits 0 through 3 of sensing element values 711 through 722 are split out into enhancement layer portion 792 and the remaining respective bits 4 through 11 are split out into base layer portion 791. The base layer 791 information can be fed into a base layer compression pipeline as part of an input stream and the enhancement layer 792 information can be stored as is in memory.

In one embodiment, boundary 790 defines the division or split between the enhancement portion or layer 792 and the base portion or layer 791. In one exemplary implementation, the configuration or location of boundary 790 can be based upon a variety of factors. In one embodiment, the likely respective compression ratios and advantageous storage benefits achievable by compression of the respective size of the enhancement portion and base portion can be used as a factor in determining the location of boundary 790. As indicted above, due to the low probability of duplication in the least significant bits there is a relatively low probability of achieving an advantageous compression ratio that saves storage space. In one embodiment, the boundary 790 is variable and can move to the right or left increasing/decreeing the number of bits in the base layer.

Figure 7B:
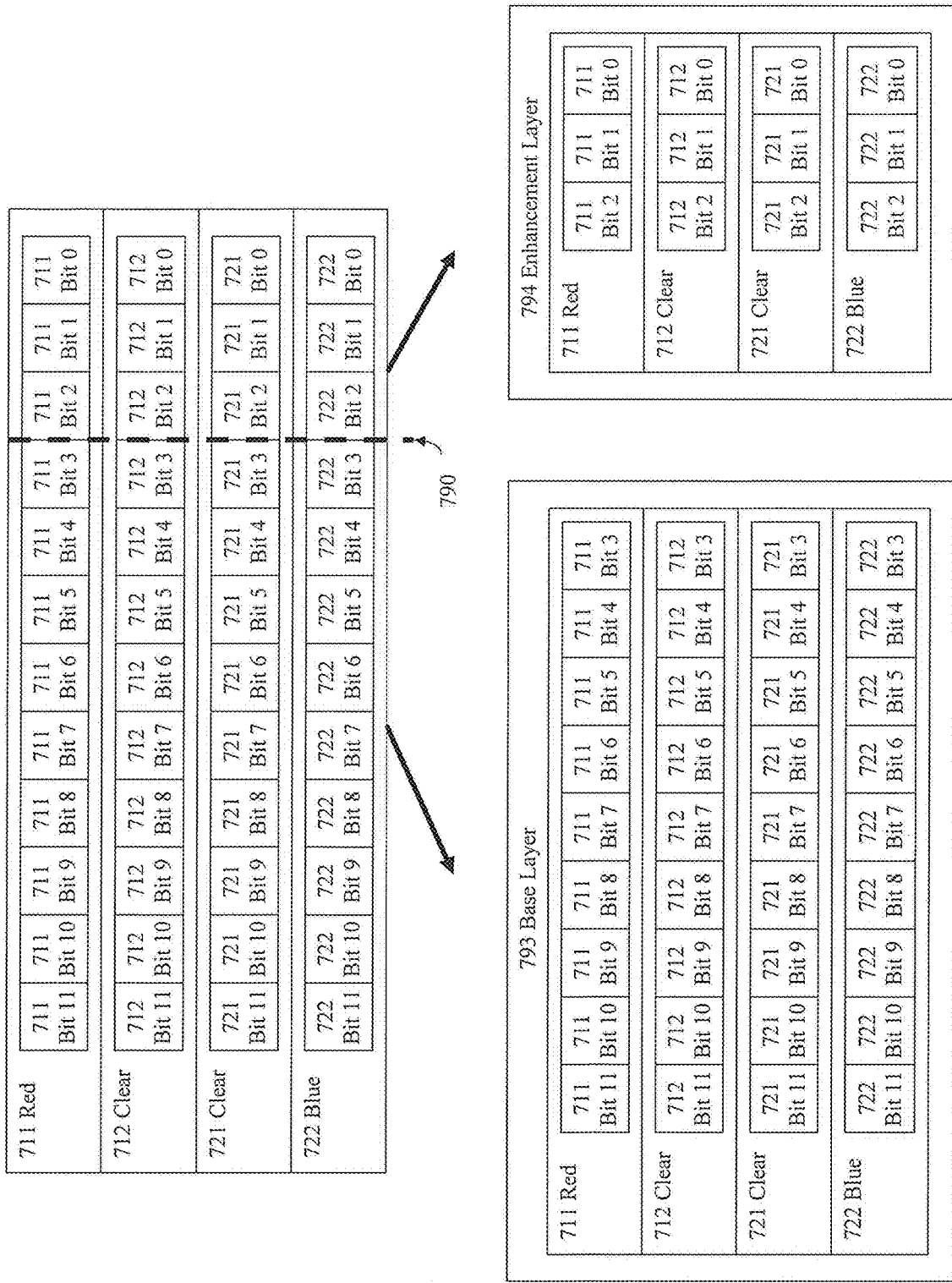
FIG. 7B is a block diagram of another exemplary base/enhancement configuration in accordance with one embodiment.

FIG. 7B is a block diagram of an exemplary base/enhancement layer boundary movement to the right in accordance with one embodiment. As boundary 790 moves to the right to include fewer least significant bits in the enhancement layer portion 794 than enhancement layer portion 792 in FIG. 7A, reducing the amount of non-compressed information stored in memory. However, as boundary 790 moves to the right to include more least significant bits in the base layer portion 793 than base layer portion 791 in FIG. 7A, the less likely there is duplications and the compression ratio of the base layer 793 decreases compare to base layer portion 791. In one exemplary implementation, boundary 790 moves over to the right a little into the location between respective bits 3 and bits 2, so that bits 11 through 3 are included in the base layer and bits 0 through 2 are included in the enhancement layer portion 794. Since the bit 3 position is now in the base layer portion 793 and likely to be significant variance in values at the bit 3 position of the respective different sensing elements (e.g., 711, 712, 721, 722, etc.), there is less likelihood of duplications that can facilitate compression.

Figure 7C:
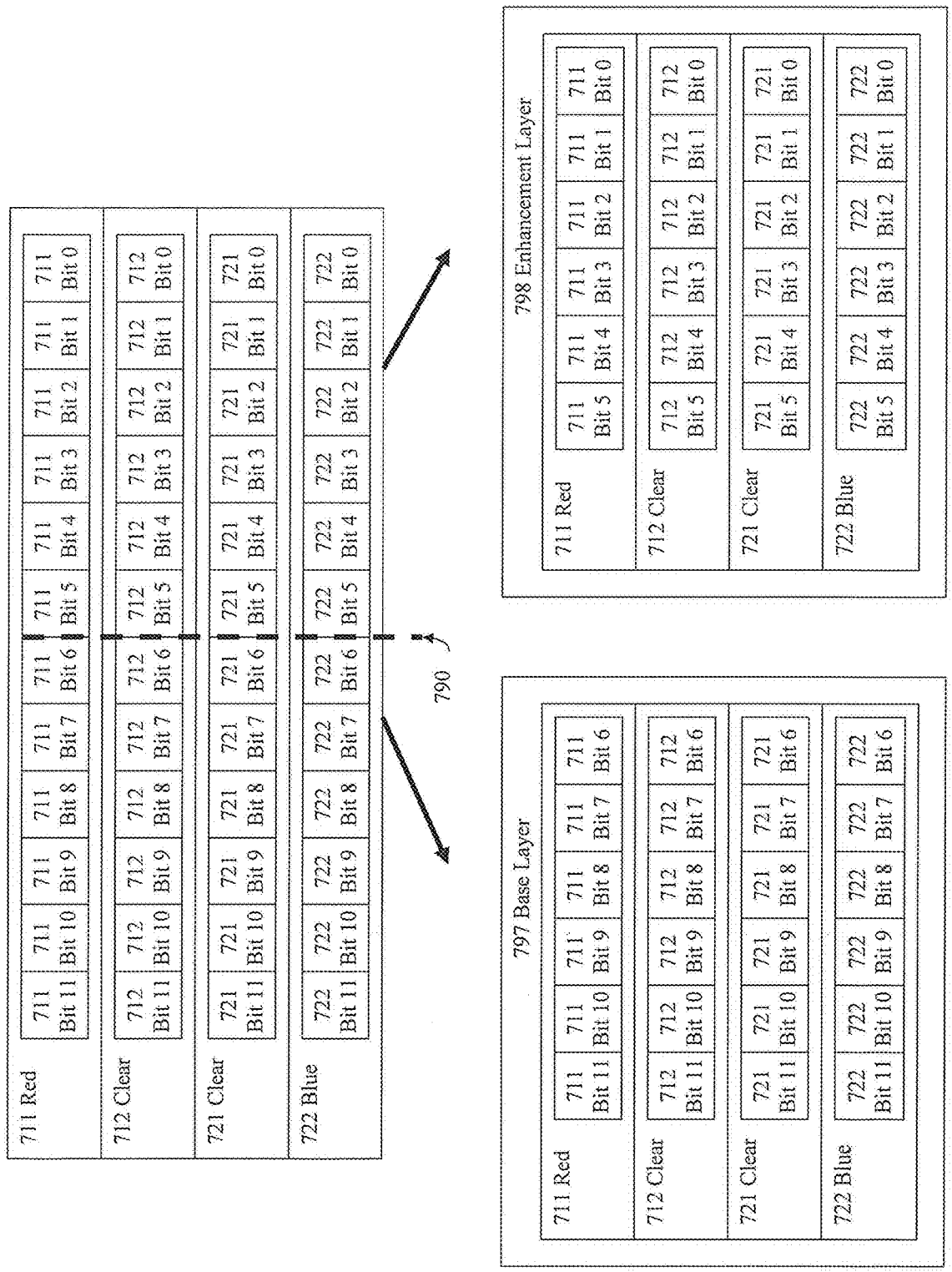
FIG. 7C is a block diagram of yet another exemplary base/enhancement configuration in accordance with one embodiment.

FIG. 7C is a block diagram of an exemplary base/enhancement layer boundary movement to the left in accordance with one embodiment. As the boundary 790 moves to the left to include higher significant bits in the enhancement layer portion 798, more information is added to the non-compressed storage portions with the effect of using up more storage space. As the boundary 790 moves to the left to remove lower significant bits in the base layer portion 797, the more likely duplication that facilitates compression occurs.

The storage time delay waiting on compression processing is also a factor that can be considered. As the boundary 790 moves to the left to decrease the number of bits in base layer portion 797 that are fed into a compression pipeline, the faster and less complex the compression operations (e.g., meaning relatively little delays, etc.). However, as the boundary 790 moves to the right to increase the number of base portion bits that are fed into a compression pipeline, the slower and more complex the compression operations (e.g., meaning relatively more delays, etc.). The type of compression being utilized can also be a factor in selecting a boundary 790 location.

Figure 8:
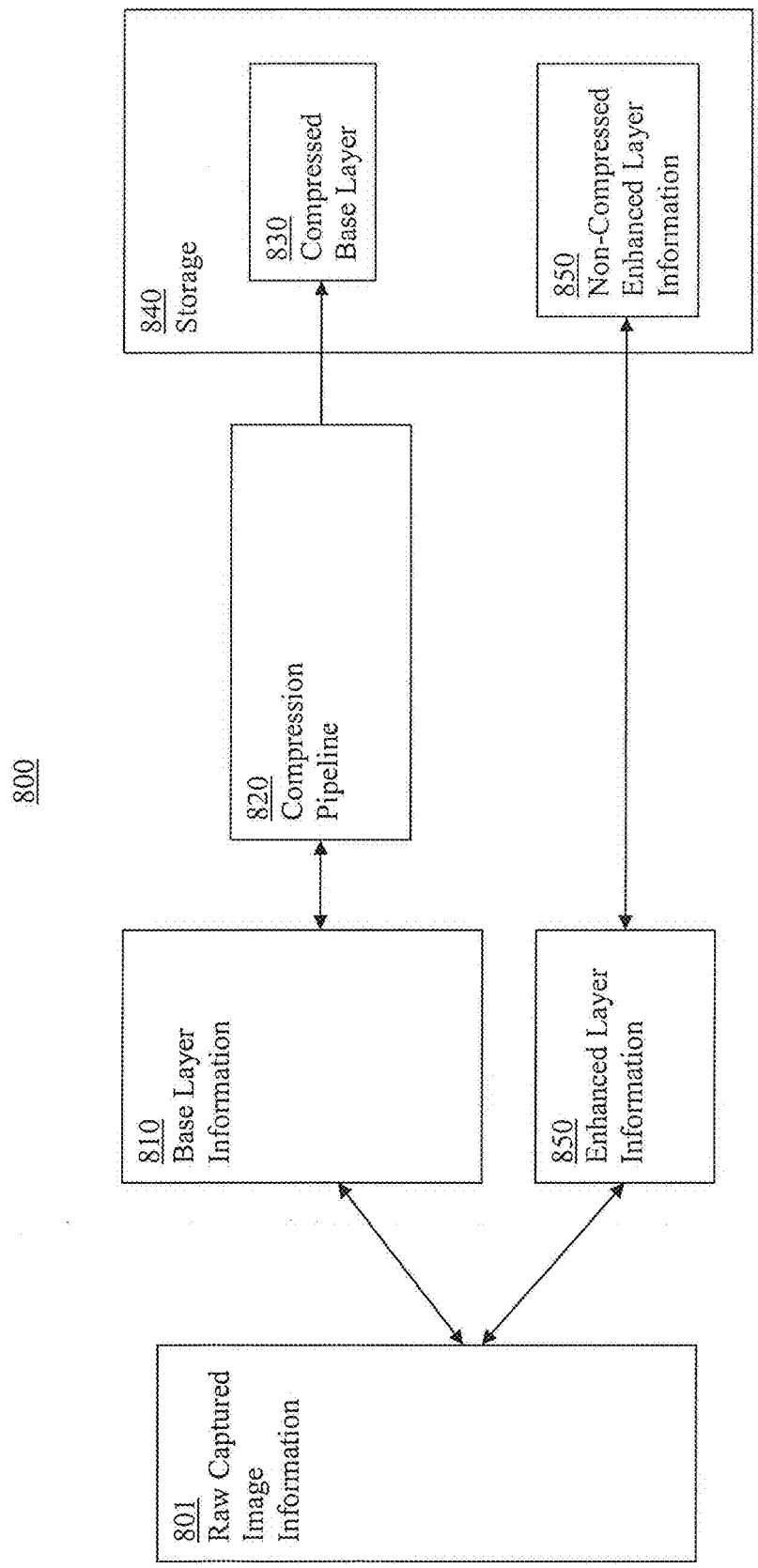
FIG. 8 is a block diagram of an exemplary raw capture image information in accordance with one embodiment.

FIG. 8 is a block diagram of an exemplary raw capture image information storage flow in accordance with one embodiment. Raw capture image information is split into base layer information 810 and enhancement layer information 850. Enhancement layer information 850 is stored in storage component 840 during a write operation. Base layer input stream 810 is fed into compression pipeline 820 which performs compression operations on the information of input stream 810 and outputs compressed information 830. The compressed information 830 is stored in storage component 840 during write operation. In one embodiment, lossless encoding/decoding operations are utilized and the compressed information 830 can be retrieved from the storage component 840 during a read operation and decoded in a manner in which the input stream and output stream include the same information.

In one embodiment, a compression pipeline is compatible with various compression standards (e.g., H.264, H2.65, AV1, etc.). Many of the standards operate on information in a particular type of color space format which can be different than the particular type of color space format the raw image information is captured in. In one embodiment, an image information capture sensor senses image information in a RCCB format while conventional compression is performed on the information configured in a YUV format. In one exemplary implementation, Y is derived or calculated luminance value, U is a derived first chrominance type value, and V is a derived second chrominance type value. It is appreciated that sensed luminance values and sensed chrominance values similar to those in FIGS. 3, 4, and 6 can be significantly different than derived or calculated luminance values and chrominance values.

Figure 9:
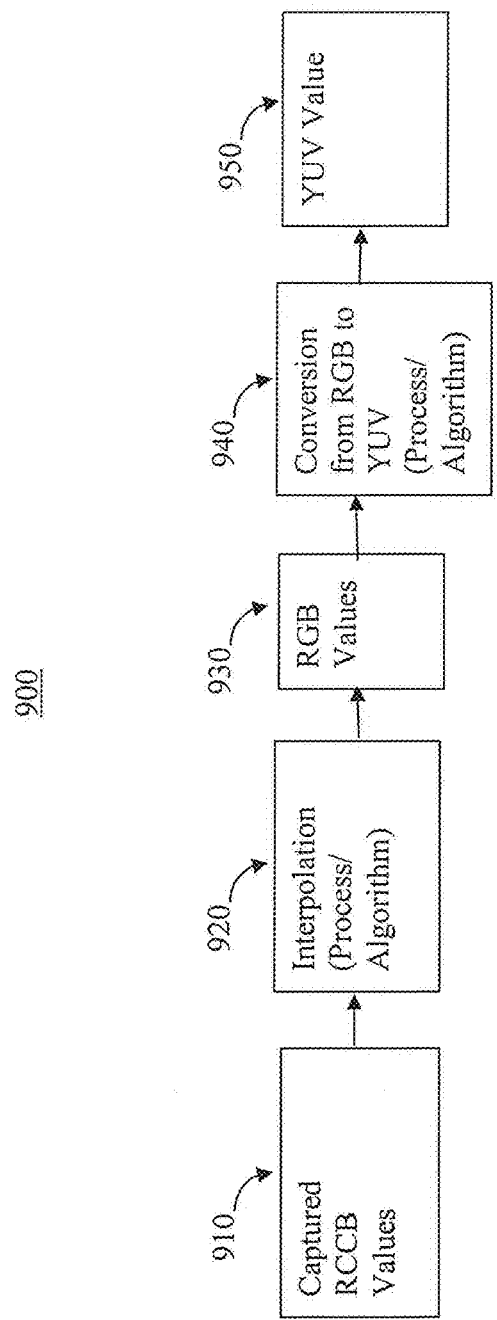
FIG. 9 is a traditional captured raw RCCB value to conventional YUV value conversion/compression.

In one embodiment, a distinction is made between sensed luminance and chrominance values and derived luminance and chrominance values. Many conventional systems use a derived YUV luminance/chrominance color space or Y'UV luma/chroma color space in pipeline processing of color image information. The expression YUV is often used to describe file formats that are encoded using YCbCr form. The UV representation of chrominance in conventional systems is typically different than linear R and B signals/values because U and V are color "difference" signals/values. Conventional YUV/Y'UV/YCbCr color spaces typically result in some loss while converting to and from an RGB color space. FIG. 9 is a traditional captured raw RCCB value to conventional YUV value conversion/compression. Captured raw RCCB values 910 are put through an interpolation process/algorithm 920 to produce RGB values 930.

In one embodiment, the RGB values are linear and in another embodiment the RGB values are gamma adjusted. The RGB values 930 are put through a conversion process/algorithm 940 to produce YUV values 350. In one example, weighted values of R, G, and B are summed to produce Y', while U and V are computed as scaled difference between Y' and B and R values. In one standard definition television (SDTV) with BT.601 embodiment, the conversion is defined by:

$Y'=0.2899R+0.587G+0.114B$  a.

$U≅0.492(B-Y')$  b.

$V≅0.877(R-Y')$.  c.

In some image compression applications, conventional lossless conversion attempts to overcome the data loss may be available but typically increase the dynamic range of input by at least one additional bit. The additional bits tend to nullify or reduce compression ratio rates.

FIG. 10 is a block diagram of a conventional YUV 420 format. A pixel array 1001 includes pixels 1011 through 1016, 1021 through 1026, 1031 through 1036, and 1041 through 1046 with corresponding RGB pixel values. The RGB pixel values are converted into derived YUV values. There is one Y value for each pixel in pixel array 1001, one U value for every four pixels in pixel array 1001, and one V value for every four pixels in pixel array 1001. In one exemplary implementation, the Y1, Y2, Y7, and Y8 values are assigned to pixels 1011, 1012, 1021, and 1022 respectively, the U1 value is shared by or is common to pixels 1011, 1012, 1021, and 1021, the V1 value is shared by or is common to pixels 1011, 1012, 1021, and 1021. Similarly, the Y3, Y4, Y9, and Y10 values are assigned to pixels 1013, 1014, 1023, and 1024, the U2 value is shared by or is common to pixels 1013, 1014, 1023, and 1024, and the V2 value is shared by or is common to pixels 1013, 1014, 1023, and 1024.

The Y, U, and V values can be broken out into respective planes. The Y values are broken out into Y plane 1002. The Y plane 1002 includes Y1 through Y24, which are values that are derived or calculated based upon the corresponding RBG values in pixel array 1001. The U values are broken out into U plane 1003. The U plane 1003 includes U1 through U6 which are values that are derived or calculated based upon the corresponding Y values in plane 1002 and R values in pixel array 1001. The V values are broken out into U plane 1004. The V plane 1003 includes V1 through V6 which are values that are derived or calculated based upon the corresponding Y values in plane 1002 and B values in pixel array 1001.

The YUV values are put in the YUV 420 format information stream 1005 that includes sequential slots 1051 through 1076 (not all shown). The sequential slots 1051 through 1064 include Y1 through Y24 values respectively. The sequential slots 1065 through 1070 include U1 through U6 values respectively. The sequential slots 1071 through 1076 include V1 through V6 values respectively.

Figure 11A:
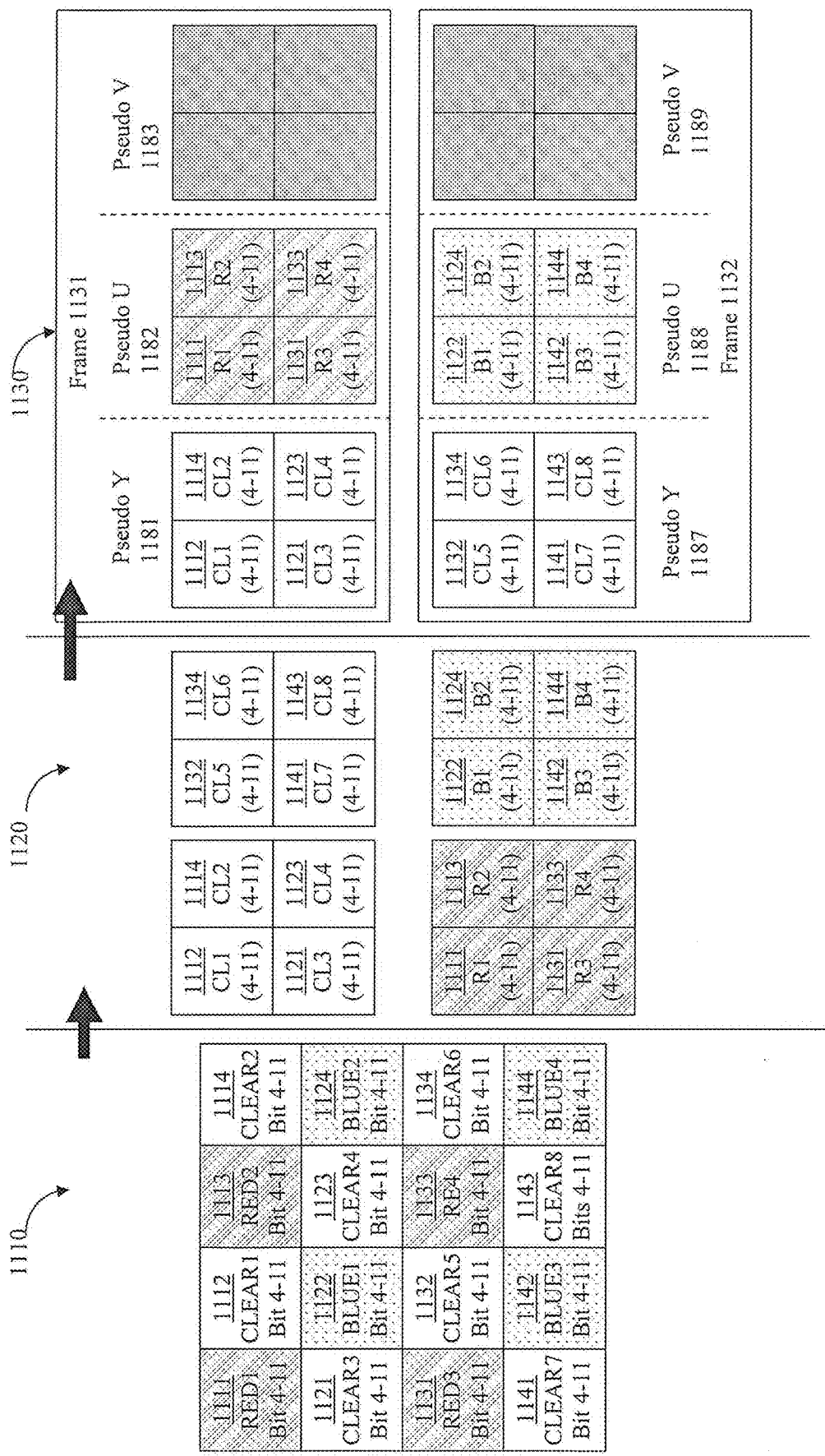
FIG. 11A is a block diagram of an exemplary separation and reconfiguration of a base portion of raw capture image information into a pseudo YUV 444 format in accordance with one embodiment.

FIG. 11A is a block diagram of an exemplary separation and reconfiguration of a base portion of raw capture image information in accordance with one embodiment. Configuration 710 includes a base portion of raw captured image information in a raw capture image information format. Configuration 1110 includes the base portion of raw captured image information for red elements (1111, 1113, 1131 and 1133), blue elements (1122, 1124, 1142 and 1144), and clear elements (1112, 1114, 1121, 1123, 1132, 1134, 1141, and 1143). In one exemplary implementation, the base portion includes bits 4-11 of the respective RCCB elements 1111 through 1144. Configuration 1120 includes the base portion of raw captured image information separated into respective color planes. The configuration 1130 includes the base portion of raw captured image information rearranged in a codec compatible configuration.

In one embodiment the 1130 configuration is considered a pseudo YUV 444 configuration or surface. In one embodiment, a pseudo YUV 444 configuration is similar to a conventional YUV 444 configuration or surface except instead of lossy converted YUV values the configuration is populated with lossless raw captured image information values. In one embodiment, four different raw capture image information RCCB elements are rearranged to form two video frames 1131 and 1132. As depicted in FIG. 10, video frame 1131 can include the clear/red (CR) component and video frame 1132 can include the clear/blue (CB) component. In one embodiment, the pseudo YUV 444 frames do not include converted YUV values but rather includes raw captured image information (e.g., RCCB, RGGB, etc.). These frames can be considered pseudo YUV444 frames, where the last component is added as a zero frame. In one embodiment, a zero or "blank" value placeholder that is outside the normal range for a U or V value can be used to create the last element or component of a frame (e.g., pseudo V components 1151 and 1152).

FIG. 11B is a block diagram of an exemplary compression input stream 1180 in a first configuration pseudo YUV 444 format in accordance with one embodiment. In one embodiment, the input stream 1180 is considered a pseudo color expression. Compression input stream 1180 includes video frame 1131 and video frame 1132. Video frame 1131 is assigned to input stream slots 1151 through 1162 and video frame 1132 is assigned to input stream slots 1163 through 1174. A pseudo Y format portion 1181 contains clear sense element values CL1, CL2, CL3, and CL4 inserted in input stream slots 1151, 1152, 1153, and 1154 respectively. A pseudo U format portion 1182 contains red sense element values R1, R2, R3, and R4 inserted in pseudo input stream slots 1155, 1156, 1157, and 1158 respectively. A pseudo V format portion 1183 contains blank values inserted in pseudo input stream slots 1159, 1160, 1161, and 1162 respectively. The filler or padding values are selected to maximize compression. In one embodiment, the same value is used repeatedly as duplicate filler or padding to increase the likelihood of significant compression. In one exemplary implementation, a zero value is used as a filler or pad value. A pseudo Y format portion 1187 contains clear sense element values CL5, CL6, CL7, and CL8 inserted in input stream slots 1163, 1164, 1165, and 1166 respectively. A pseudo U format portion 1188 contains red sense element values B1, B2, B3, and B4 inserted in pseudo input stream slots 1167, 1168, 1169, and 1170 respectively. A pseudo V format portion 1189 contains blank values inserted in pseudo input stream slots 1171, 1172, 1173, and 1174 respectively.

Compression input stream 1191 in a derived YUV 444 format is shown to illustrate an exemplary difference to compression input stream 1192 in a pseudo YUV 444 format. Compression input stream 1191 includes video frame 1192 and video frame 1193. Video frame 1192 is assigned to input stream slots 1151' through 1162' and video frame 1193 is assigned to input stream slots 1163' through 1174'. Input stream slots 1151', 1152' 1153', and 1154' contain derived Y1, Y2, Y3, and Y4 values respectively. Input stream slots 1155', 1156' 1157', and 1158' contain derived U1, U2, U3, and U4 values respectively. Input stream slots 1159', 1160' 1161', and 1162' contain derived V1, V2, V3, and V4 values respectively. Input stream slots 1163', 1164', 1165', and 1166' contain derived Y5, Y6, Y7, and Y8 values respectively. Input stream slots 1167', 1168', 1169', and 1170' contain derived U5, U6, U7, and U8 values respectively. Input stream slots 1171', 1172', 1173', and 1174' contain derived V5, V6, V7, and V8 values respectively.

In one embodiment compression input steam 1180 is pseudo YUV 444 format is fed into YUV compatible compression encoder. In one exemplary implementation, the YUV compatible compression encoder operates on the CL1 value in slot 1151 as if it were the Y1 value in slot 1151', the CL2 value in slot 1152 as if it were the Y2 value in slot 1152', the CL3 value in slot 1153 as if it were the Y3 value in slot 1153', and so on. In one embodiment, due to the similarities in the input streams the encoder tries to compress CL1, CL2, CL3, and CL4 as if they were Y1, Y2, Y3, and Y4 values.

FIG. 11C is a block diagram of an exemplary compression input stream 2180 in a first configuration pseudo YUV 444 format in accordance with one embodiment. In one embodiment, the input stream 2180 is considered a pseudo color expression. Compression input stream 2180 includes video frame 2131 and video frame 2132. In one embodiment, video frame 2131 and 2312 are similar to video frames 1131 and 1132 of FIG. 11A. Portions of video frame 2131 and video frame 2132 are interleaved in compression input stream 2180. Video frame 2131 is assigned to input stream slots 2151 through 2154, 2159 through 2162, and 2167 through 2170. Video frame 2132 is assigned to input stream slots 2155 through 2158, 2163 through 2166, and 2171 through 2174. A pseudo Y format portion 2182 contains clear sense element values CL1, CL2, CL3, and CL4 inserted in input stream slots 2151, 2152, 2153, and 2154 respectively. A pseudo U format portion 1182 contains red sense element values R1, R2, R3, and R4 inserted in pseudo input stream slots 2155, 2156, 2157, and 2158 respectively. A pseudo V format portion 2183 contains blank values inserted in pseudo input stream slots 2159, 2160, 2161, and 2162 respectively. The filler or padding values are selected to maximize compression. In one embodiment, the same value is used repeatedly as duplicate filler or padding to increase the likelihood of significant compression. In one exemplary implementation, a zero value is used as a filler or pad value. A pseudo Y format portion 2187 contains clear sense element values CL5, CL6, CL7, and CL8 inserted in input stream slots 2163, 2164, 2165, and 2166 respectively. A pseudo U format portion 1188 contains red sense element values B1, B2, B3, and B4 inserted in pseudo input stream slots 2167, 2168, 2169, and 2170 respectively. A pseudo V format portion 2189 contains blank values inserted in pseudo input stream slots 2171, 2172, 2173, and 2174 respectively.

Compression input stream 2190 in a derived YUV 444 format is shown to illustrate an exemplary difference to compression input stream 2180 in a pseudo YUV 444 format. Compression input stream 2190 includes video frame 2191 and video frame 2192. Video frame 2191 is assigned to input stream slots 2151' through 2154', 2159' through 2162', and 2167' through 2170'. Input stream slots 2151', 2152' 2153', and 2154' contain derived Y1, Y2, Y3, and Y4 values respectively. Input stream slots 2159', 2160', 2161', and 2162' contain derived U1, U2, U3, and U4 values respectively. Input stream slots 2167', 2168', 2169', and 2170' contain derived V1, V2, V3, and V4 values respectively. Video frame 2192 is assigned to input stream slots 2155' through 2158', 2163' through 2166' and 2171' through 2192'. Input stream slots 2155', 2156', 2157', and 2158' contain derived Y5, Y6, Y7, and Y8 values respectively. Input stream slots 2163', 2164', 1165', and 2166' contain derived U5, U6, U7, and U8 values respectively. Input stream slots 2171', 2172', 2173', and 2174' contain derived V5, V6, V7, and V8 values respectively.

Figure 12A:
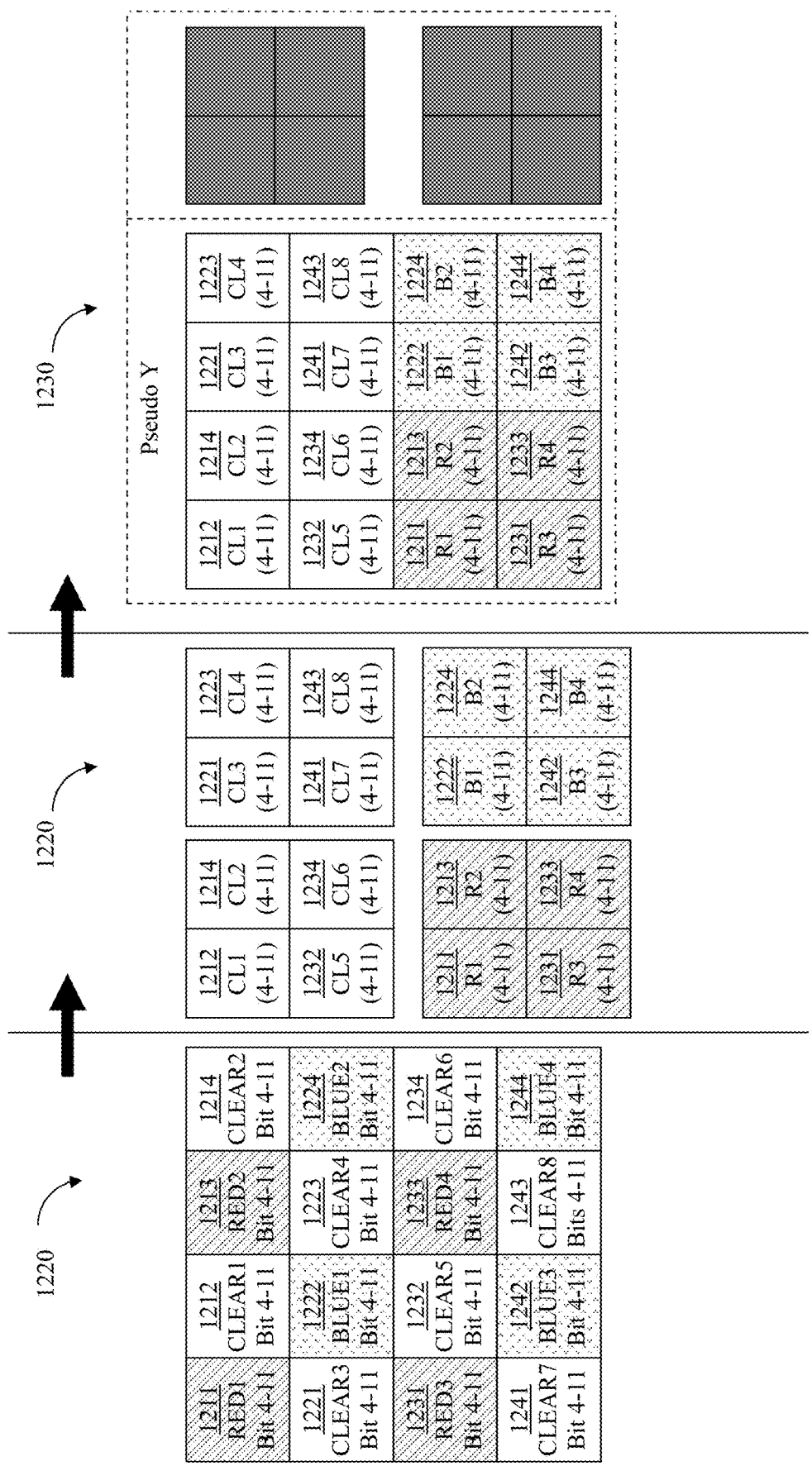
FIG. 12A is a block diagram of an exemplary separation and reconfiguration of a base portion of raw capture image information into a pseudo YUV 420 format in accordance with one embodiment.

FIG. 12A is a block diagram of exemplary separation and reconfiguration of a base portion of raw capture image information in accordance with one embodiment. Configuration 1210 includes a base portion of raw captured image information in a raw capture image information format. Configuration 1210 includes the base portion of raw captured image information for red elements 1211, 1213, 1231, and 1233, blue elements 1222, 1224, 1242 and 1244, and clear elements 1212, 1214, 1221, 1223, 1232, 1234, 1241, and 1243. In one exemplary implementation, the base portion includes bits 4-11 of the respective RCCB elements 1211 through 1244. Configuration 1220 includes the base portion of raw captured image information separated into respective color planes. The configuration 1230 includes the base portion of raw captured image information rearranged in a codec compatible configuration. In one embodiment, as part of rearranging the surface the base layer is considered a pseudo Y component, and the pseudo U and pseudo V components are added as pseudo blank or zero sampling framing zero frame. The rearranged frame is considered as a pseudo YUV420 frame and processed further.

FIG. 12B is a block diagram of an exemplary compression input stream 1292 in a pseudo YUV 420 format in accordance with one embodiment. In one embodiment, the input stream 1192 is considered a pseudo color expression. Compression input stream 1292 is assigned to input stream slots 1251 through 1274. A pseudo Y format portion 1281 contains clear sense element values CL1 through CL8, R1 through R4 and B1 through B4 values inserted in input stream slots 1251 through 1266 respectively. A pseudo U format portion 1282 and a pseudo V format portion 1283 both contain blank values inserted in pseudo input stream slots 1267 through 1270 and 1271 through 1274 respectively. The filler or padding values are selected to maximize compression.

Compression input stream 1291 in a derived YUV 444 format is shown to illustrate an exemplary difference to compression input stream 1292 in a pseudo YUV 444 format. Compression input stream 1291 includes input stream slots 1251' through 1274'. Input stream slots 1251' through 1266 contain derived Y1 through Y16 values respectively. Input stream slots 1267 through 1270 contain derived U1 through U4 values respectively. Input stream slots 1271 through 1274 contain derived V1 through V4 values respectively.

In one embodiment compression input steam 1292 in pseudo YUV 420 format is fed into YUV compatible compression encoder. In one exemplary implementation, the YUV compatible compression encoder operates on the CL1 value in slot 1251 as if it were the Y1 value in slot 1151', the CL2 value in slot 1252 as if it were the Y2 value in slot 1252', the CL3 value in slot 1253 as if it were the Y3 value in slot 1253', and so on. In one embodiment, due to the similarities in the input streams the encoder tries to compress CL1, CL2, CL3, and CL4 as if they were Y1, Y2, Y3, and Y4 values.

Figure 13A:
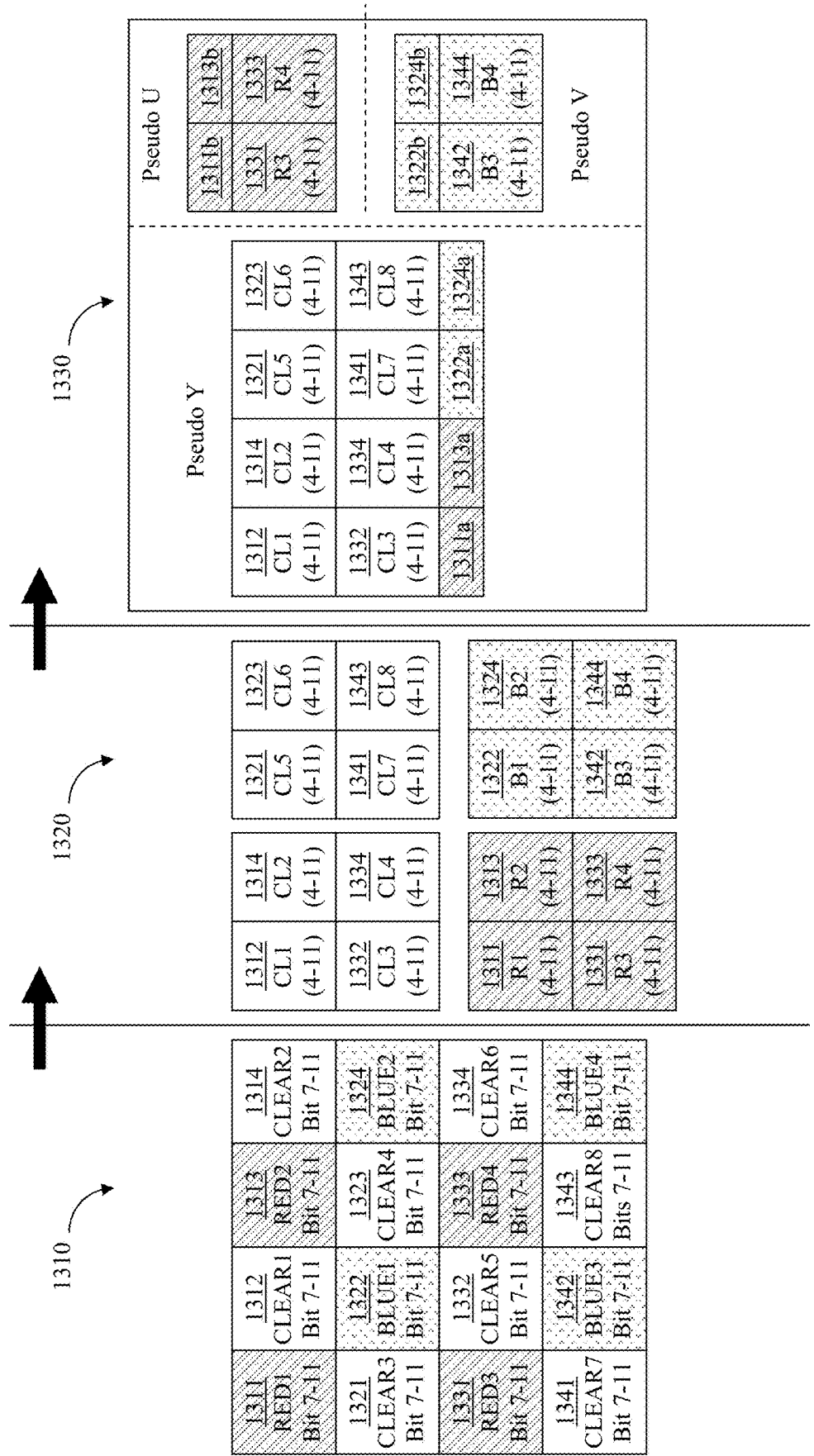
FIG. 13A is a block diagram of an exemplary separation and reconfiguration of a base portion of raw capture image information into another pseudo YUV 420 in accordance with one embodiment.

In one embodiment, the base layer is rearranged into a pseudo YUV420 video frame, where a portion of the R and B components are considered U and V components. The remaining R, B, and C components are considered a pseudo Y component. FIG. 13A is a block diagram of exemplary separation and reconfiguration of a base portion of raw capture image information in accordance with one embodiment. In one embodiment, the input image is rearranged as YUV420 and a zero plane is not added. Configuration 1310 includes a base portion of raw captured image information in a raw capture image information format. Configuration 1310 includes the base portion of raw captured image information for red elements 1311, 1313, 1331, and 1333, blue elements 1322, 1324, 1342 and 1344, and clear elements 1312, 1314, 1321, 1323, 1332, 1334, 1341, and 1343. In one exemplary implementation, the base portion includes bits 4-11 of the respective RCCB elements 1311 through 1344. Configuration 1320 includes the base portion of raw captured image information separated into respective color planes. The configuration 1330 includes the base portion of raw captured image information rearranged in a codec compatible configuration. In one embodiment, as part of rearranging the surface the pseudo Y portion includes the clear values CL1 through CL8, red values R1a and R2a, blue values B1a and B2a, the pseudo U portion includes red values R1b, R2b, R3, and R4, and the pseudo V portion includes blue values B1b, B2b, B3, and B4. In one exemplary implementation, the R1a, R2a, B1a, and B2a include the bits 4-7 of the R1a, R2a, B1a, and B2a elements respectively, and the R1b, R2b, B1b, and B2b include the bits 8-11 of the R1a, R2a, B1a, and B2a elements respectively. The rearranged frame is considered as a pseudo YUV420 frame and processed further.

FIG. 13B is a block diagram of an exemplary compression input stream 1392 in a pseudo YUV 444 format in accordance with one embodiment. In one embodiment, the input stream 1392 is considered a pseudo color expression. Compression input stream 1392 is assigned to input stream slots 1351 through 1366. A pseudo Y format portion 1381 contains clear sense element values CL1 through CL8, R1a, R2a, B1a, and B2a values inserted in input stream slots 1351 through 1360 respectively. A pseudo U format portion 1382 contains R1b, R2b, R3, and R4 values inserted in input stream slots 1361 through 1363 respectively. A pseudo V format portion 1383 contains B1b, B2b, B3, and B4 values inserted in input stream slots 1361 through 1366 respectively.

Compression input stream 1391 in a derived YUV 444 format is shown to illustrate an exemplary difference to compression input stream 1392 in a pseudo YUV 444 format. Compression input stream 1391 includes input stream slots 1351' through 116'. Input stream slots 1351' through 1360' contain derived Y1 through Y10 values respectively. Input stream slots 1361 through 1363 contain derived U1 through U4 values respectively. Input stream slots 1364 through 1366 contain derived V1 through V4 values respectively.

In one embodiment compression input steam 1392 in pseudo YUV 420 format is fed into YUV compatible compression encoder. In one exemplary implementation, the YUV compatible compression encoder operates on the CL1 value in slot 1351 as if it were the Y1 value in slot 1351', the CL2 value in slot 1352 as if it were the Y2 value in slot 1352', the CL3 value in slot 1353 as if it were the Y3 value in slot 1353', and so on. In one embodiment, due to the similarities in the input streams the encoder tries to compress CL1, CL2, CL3, and CL4 as if they were Y1, Y2, Y3, and Y4 values.

The conventional YUV 420 is a common video surface format and is widely supported. While not obvious, a conventional YUV 420 encoder can be readily adapted to perform encoding on pseudo YUV 420 format input. In one embodiment, similar to the configuration in FIG. 13 pseudo YUV 420 zero planes are not added and the base layer can be processed in an efficient way. In one embodiment, the resolution of the YUV 420 surface is calculated as follows:

YUV420_width=input_width      a.

YUV420_height=(input_height+2)/3*2.      b.

The C components of sensor frame form the pseudo Y surface. A portion of the R and B components can also be used to form the pseudo Y surface. In one embodiment (YUV420_height−input_height/2) rows of the R and B component are included in the Y surface and remaining rows are considered as U and V surfaces.

In one embodiment, the resolution of a sensor frame is 1920×1240 and resolution of YUV 420 video frame is 1920×828. In one embodiment, the resolution is based upon setting the YUV420_width to a value (YUV420_width=1920) and calculating the YUV420 height. In one exemplary implementation the YUV420_height=(1240+2)/3*2=828 and the UV surface resolution is 960×414. The last 2 lines of the UV surface can be padded with content from the last row or zero.

Figure 14A:
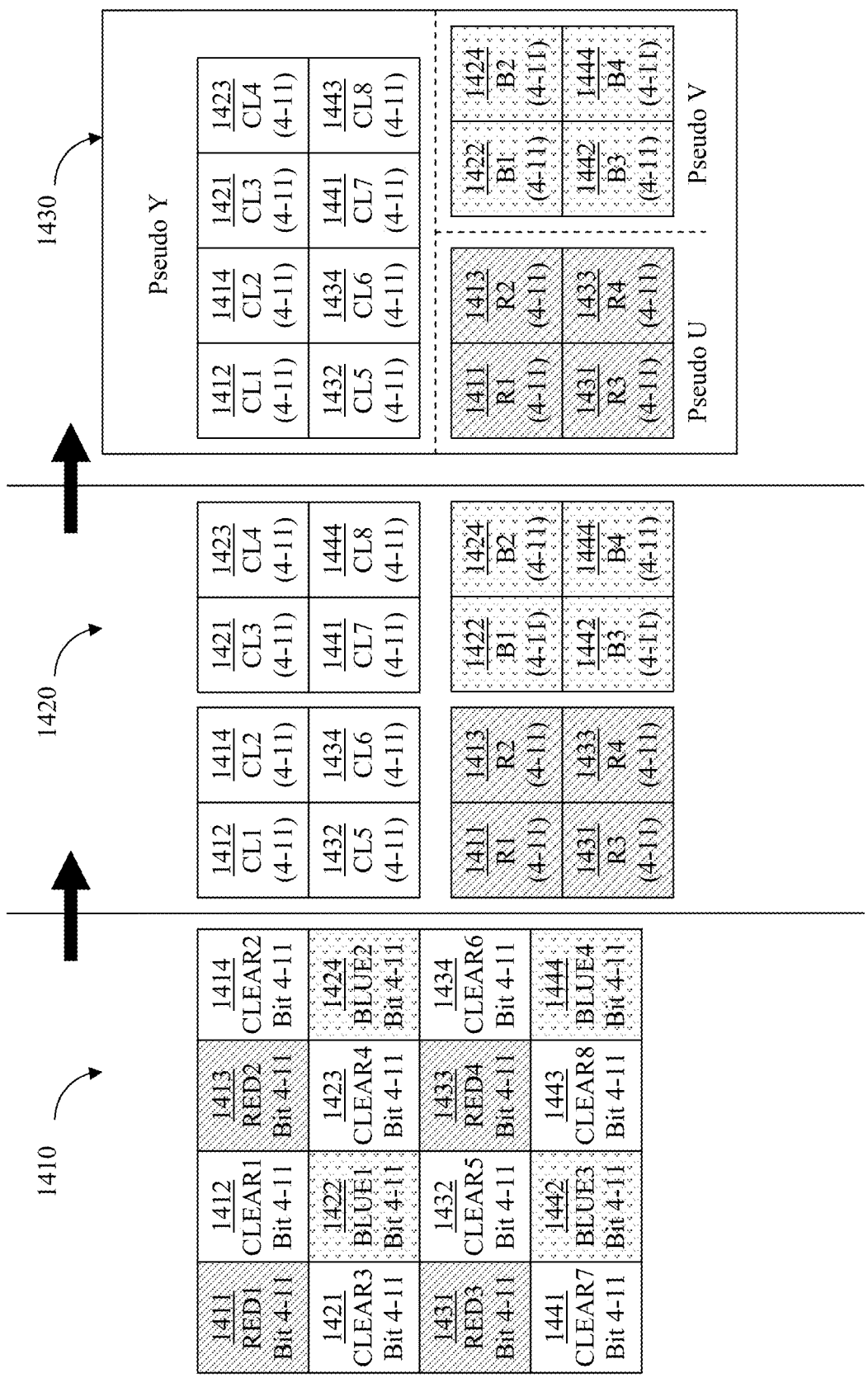
FIG. 14A is a block diagram of exemplary separation and reconfiguration of a base portion of raw capture image information into a pseudo YUV 422 format in accordance with one embodiment.

It is appreciated different arrangements for base layer planes can be utilized. Another option available for base layer arrangement is for the base layer portion to be packed in single 4:2:2 format and encoded. FIG. 14A is a block diagram of an exemplary separation and reconfiguration of a base portion of raw capture image information in accordance with one embodiment. In one embodiment, the input image is rearranged as a pseudo YUV422 configuration. Configuration 1410 includes a base portion raw captured image information in a raw capture image information format. Configuration 1410 includes the base portion raw captured image information for red elements 1411, 1413, 1431 and 1433, blue elements 1422, 1424, 1442 and 1444, and clear elements 1412, 1414, 1421, 1423, 1432, 1434, 1441, and 1443. In one exemplary implementation, the base portion includes bits 4-11 of the respective RCCB elements 1411 through 1444. Configuration 1420 includes the base portion raw captured image information separated into respective color planes. The configuration 1430 includes the base portion raw captured image information rearranged in a codec compatible configuration. In one embodiment, as part of rearranging the surface the base layer is considered to include a pseudo Y component, a pseudo V component, and a pseudo U component. The rearranged frame is considered a pseudo YUV422 frame and processed further.

FIG. 14B is a block diagram of an exemplary compression input stream 1492 in a pseudo YUV 422 format in accordance with one embodiment. In one embodiment, the input stream 1492 is considered a pseudo color expression. Compression input stream 1492 is assigned to input stream slots 1451 through 1466. A pseudo Y format portion 1481 contains clear sense element values CL1 through CL8 values inserted in input stream slots 1451 through 1458 respectively. A pseudo U format portion 1482 contains R1 through R4 values inserted in input stream slots 1459 through 1462 respectively. A pseudo V format portion 1483 contains B1 through B4 values inserted in input stream slots 1463 through 1466 respectively.

Compression input stream 1491 in a derived YUV 422 format is shown to illustrate an exemplary difference to compression input stream 1492 in a pseudo YUV 422 format. Compression input stream 1491 includes input stream slots 1451' through 1466'. Input stream slots 1451' through 1458' contain derived Y1 through Y8 values respectively. Input stream slots 1459 through 1462 contain derived U1 through U4 values respectively. Input stream slots 1463 through 1466 contain derived V1 through V4 values respectively.

In one embodiment compression input steam 1492 in pseudo YUV 422 format is fed into YUV compatible compression encoder. In one exemplary implementation, the YUV compatible compression encoder operates on the CL1 value in slot 1451 as if it were the Y1 value in slot 1451', the CL2 value in slot 1452 as if it were the Y2 value in slot 1452', the CL3 value in slot 1453 as if it were the Y3 value in slot 1453', and so on. In one embodiment, due to the similarities in the input streams the encoder tries to compress CL1, CL2, CL3, and CL4 as if they were Y1, Y2, Y3, and Y4 values.

In one embodiment, information associated with the base layer video frames in a pseudo YUV compression compatible format is arranged using the RCCB color space values as values in the YUV compression compatible format, rather than YUV color space values converted from the RCCB or RBG color space values. In one exemplary implementation, traditional YUV conversion values are not utilized in compression input configured in a pseudo YUV compression format. The traditional YUV conversion values can include U being calculated as being (B−Y) and V being calculated as being proportional to (R−Y) using various scale factors and off-set values, using weighted values of RGB to find Y and then computing U and V as scaled differences between Y and R and B values, and so on.

Figure 15:
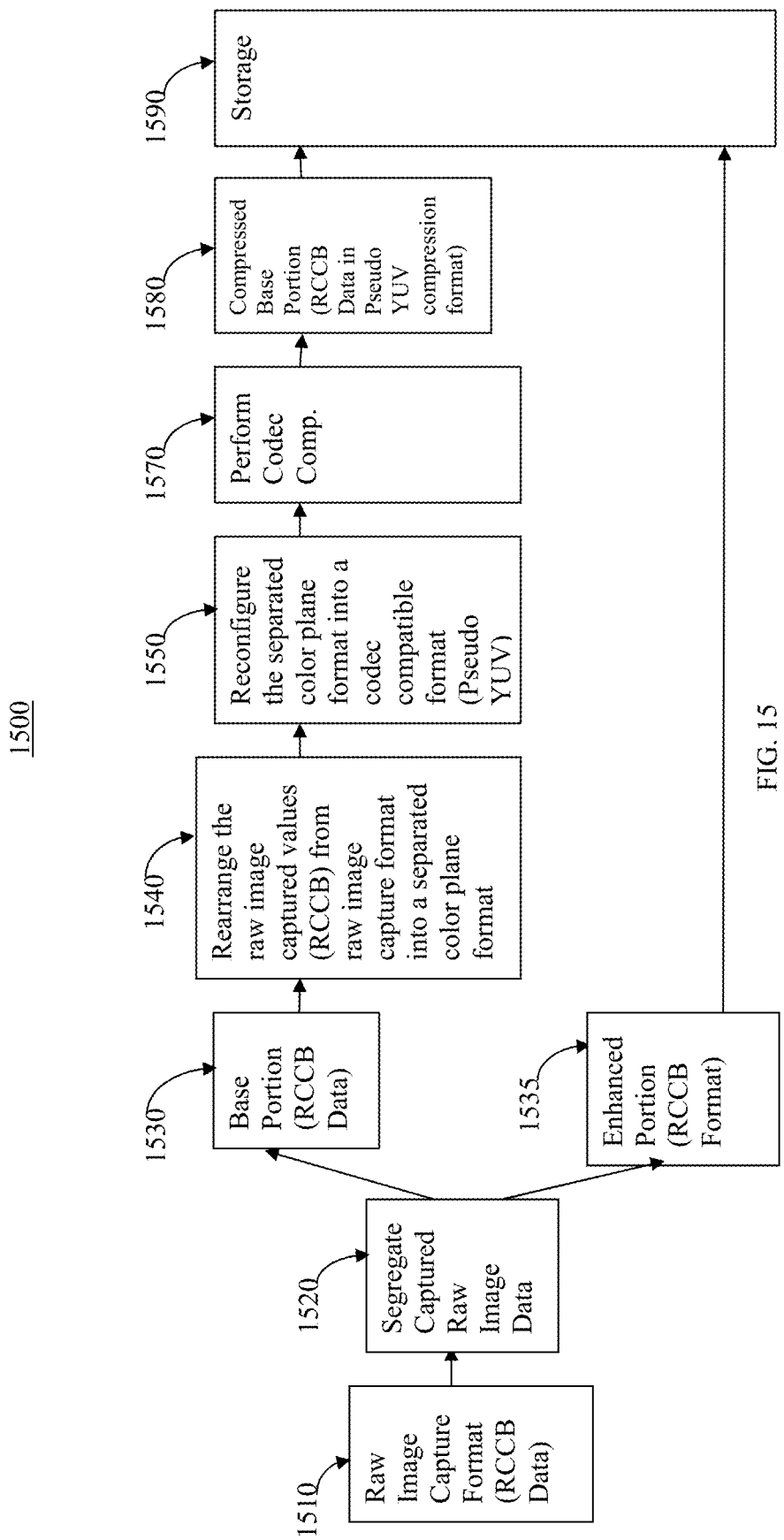
FIG. 15 is a block diagram of the captured value preservation compression process in accordance with one embodiment.

As indicated above it is important that the captured values be preserved in many applications. FIG. 15 is a block diagram of the captured value preservation compression process 1500 in accordance with one embodiment. In one exemplary implementation, captured color component values are preserved though out storage write compression processes and storage read decompression processes. In one embodiment, the captured color component values are not converted to or from another color space as part of storage write compression processes and storage read decompression processes. In one exemplary implementation, the captured value preservation compression process is lossless, unlike conventional conversion processes in which raw captured image values (e.g. R, G, B, etc.) are converted to other color space values (e.g., Y, U, V, etc.) introducing information loss or distortion.

In block 1510, raw captured image values are received in a raw image capture format (e.g., RCCB, RGGB, Bayer format, etc.). In one embodiment, raw captured image values are color values output by an array of color sensing elements. The color sensing elements can be included in a camera. The raw captured image values are from sensors in a vehicle. In one exemplary implementation, the vehicle is similar to In block 1520, the raw capture image values are segregated into a base portion 1530 and an enhanced portion 1540. The boundary of the segregation can be based upon a variety of factors (e.g., a compression benefits analysis of the base layer portion, the type of compression scheme, the time it takes to perform compression operations, etc.). In one embodiment, the segregation is similar to the segregation illustrated FIGS. 7a, 7B, and 7C.

In block 1540, base portion raw capture image values 1530 are rearranged from a raw capture image format (e.g., RCCB, RGGB, Bayer format, etc.) to a color plane separated format. In one embodiment, the different color components of (e.g., Red (R), Clear (C) and Blue (B), etc.) are split into different planes. The planes can be processed one at a time. Additional explanation of exemplary raw captured image RCCB values received in a raw image capture format is described with respect to FIGS. 7, 8, and 9.

In block 1550, the raw capture image values are reconfigured from the color plane separated format into a codec compatible format. In one embodiment, the code compatible format is considered a pseudo color expression. The codec compatible format can be a pseudo codec compatible format in which raw captured image information expressed in first color space values are configured in a second color space coded format. In one embodiment, the codec is similar to various standards (e.g., a H.264 compatible codec, a H.265 compatible codec, a VP9 compatible codec, AV1 compatible codec, and other video encoders). In one embodiment, a pseudo YUV format is utilized. In one exemplary implementation, the pseudo YUV is similar to a YUV format except raw captured image values are used instead of YUV values. Additional explanation of exemplary raw captured image RCCB values received in a raw image capture format is described with respect to FIGS. 11, 12, 13, and 14. In one embodiment, the base layer portion compression input format is a pseudo YUV format. In one embodiment, the pseudo YUV compression format is similar or compatible with YUV compression.

In block 1570, a compression process or mechanism is performed. In one embodiment, a codec process is performed on the base portion of raw image captured values arranged in the separated color codec format. In one exemplary implementation, encoding is performed on a base portion of raw image captured values configured in a pseudo YUV format. In one embodiment, a YUV compatible compression (e.g., H.264, H.265, AV1, etc.) is performed on the base portion of raw image captured values. In one exemplary implementation, a base portion of RCCB values in a compressed pseudo YUV format are output.

In block 1590, the output of the compression process is stored in storage.

In one embodiment, to exploit intra frame redundancies in RCCB base layer, all 4 components need to be separated first. These 4 different components are then rearranged to form video frames.

FIG. 16 is a flow chart of an exemplary method 1600 in accordance with one embodiment.

In block 1610, raw captured image information is received from an image capture device, wherein the image information corresponds to a sensing element or sensel values. The sensel information can be used to form image pixel data. In one embodiment the image capture device is a camera.

In block 1620, the pixel data is segregated into a base layer portion and an enhanced layer portion, wherein the segregation is based upon various factors. The boundary between the base layer portion and the enhanced layer portion can be based upon various factors.

In block 1630, the base layer portion is reconfigured into a compression encoder input format. In one embodiment, the reconfiguring includes converting the base layer portion from a base layer portion raw capture format into a base layer portion compression input. In one embodiment, the reconfigured base layer is considered a pseudo color expression.

In block 1640, the reconfigured base layer portion is compressed. In one embodiment, a pseudo YUV encoder is used to compress the information. It is appreciated that the reconfigured base layer portion can be compatible with various types of compression standards (e.g., H.264, H.265, VP9, AV1, etc.).

In block 1650, the raw captured image information is stored. In one embodiment, an enhancement layer portion is stored in non-compressed format and a base layer portion is stored in a compressed format.

It is appreciated that significant information compression can be achieved utilizing raw capture image information first color space values configured in a pseudo encoder second color space format. The following table includes exemplary results of compression achieved in accordance with a pseudo YUV 420 format conversion.

| # | stream name | input size (in GB) | bit raw file size | File Size H264 | Total Size H264 | Compression ratio H264 |
|---|---|---|---|---|---|---|
| 1 | video_0.raw | 53.5 | 13.4 | 8.1 | 21.5 | 2.488372093 |
| 2 | video_1.raw | 53.5 | 13.4 | 9.2 | 22.6 | 2.367256637 |
| 3 | video_2.raw | 15.2 | 3.8 | 2.89 | 6.69 | 2.272047833 |
| 4 | video_3.raw | 15.2 | 3.8 | 3.14 | 6.94 | 2.190201729 |
| 5 | video_4.raw | 20.5 | 5.1 | 4.8 | 9.9 | 2.070707071 |
| 6 | video_5.raw | 20.5 | 5.1 | 5.1 | 10.2 | 2.009803922 |
| 7 | video_6.raw | 23.5 | 5.8 | 4.3 | 10.1 | 2.326732673 |
| 8 | video_7.raw | 23.5 | 5.8 | 3.4 | 9.2 | 2.554347826 |

In the use cases explained above, the encode performance is more important than decode performance as encoding must be done in real time. In one exemplary implementation, one video frame can be encoded in around 3 ms. So around 330 sensor frames per second can be processed. In one embodiment, multiple sensor capture is supported with this scheme using a T186 platform.

In one embodiment, video frames can be encoded using an H.264 CAVLC 4:4:4 Intra profile. The reasons for using selecting an H.264 encoder can include better compression tools and encoding speed. Symmetric encode and decode operations, and very good decode performance can be achieved. H.264 YUV 420 decoding is supported in NVDEC. Utilizing intra only frame facilitates support of random access to each frame.

It is appreciated that utilization of a pseudo YUV format enables a YUV compatible encoder to improve performance. The pseudo YUV format enables a YUV compatible encoder to effectively store more information in a smaller amount of storage space than a conventional YUV input format. In one embodiment, the raw captured image information values used in the pseudo YUV format enable a YUV encoder to conveniently provide lossless compression that is not achievable with conventional YUV encoders. Pseudo YUV format segregation into a base layer portion and enhancement layer portion also improves performance of a YUV encoder by reducing compression processing efforts on portions of raw captured image information not likely to be very compressible. The pseudo YUV format segregation also enables a YUV compatible encoder to encode the base layer portion faster than a traditional approach of attempting to encode the entire derived YUV information.

Figure 17:
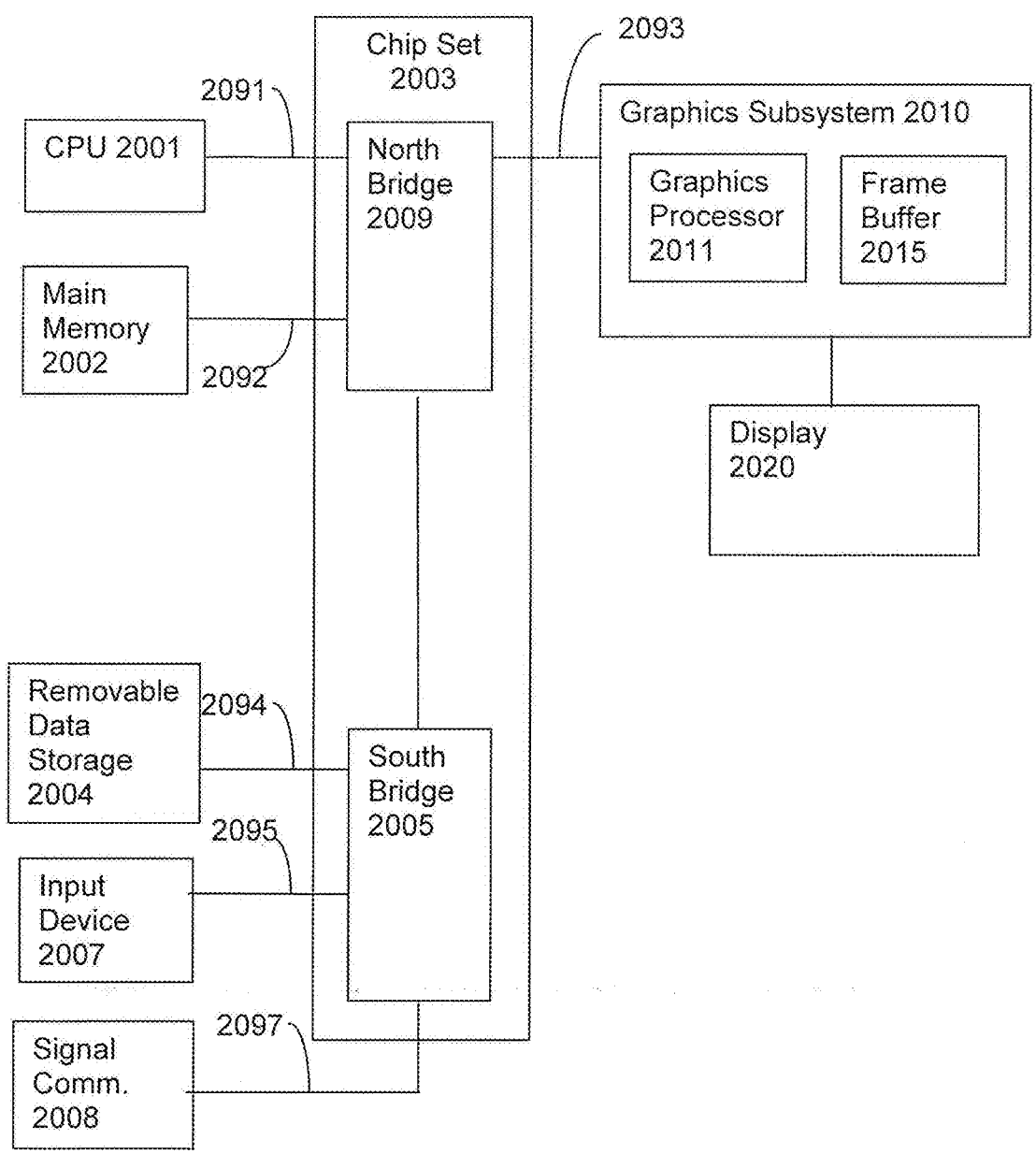
FIG. 17 is a block diagram of a computer system in accordance with one embodiment.

FIG. 17 is a block diagram of a computer system 2000 in accordance with one embodiment. In one embodiment, computer system 2000 is similar to computer system 150. In one embodiment, computer system 2000 is similar to a remote computer system (e.g., storage server 230, processing server 240, etc.). In one exemplary implementation, an optional display can be utilized to view the capture image or information associated with the captured image.

With reference to FIG. 17, a block diagram of an exemplary computer system 2000 is shown, one embodiment of a computer system upon which embodiments of the present invention can be implemented. Computer system 2000 includes central processor unit (CPU) 2001, main memory 2002 (e.g., random access memory), chip set 2003 with north bridge 2009 and south bridge 2005, removable data storage device 2004, input device 2007, signal communications port 2008, and graphics subsystem 2010 which is coupled to display 2020. Computer system 2000 includes several buses for communicatively coupling the components of computer system 2000. Communication bus 2091 (e.g., a front side bus) couples north bridge 2009 of chipset 2003 to central processor unit 2001. Communication bus 2092 (e.g., a main memory bus) couples the north bridge 2009 of chipset 2003 to main memory 2002. Communication bus 2093 (e.g., the Advanced Graphics Port interface, Peripheral Component Interconnect (PCI) Express bus, etc.) couples the north bridge of chipset 2003 to graphic subsystem 2010. Communication buses 2094, 2095 and 2097 (e.g., a PCIe bus, etc.) couples the south bridge 2005 of chip set 2003 to removable data storage device 2004, input device 2007, signal communications port 2008 respectively. Graphics subsystem 2010 includes graphics processor unit (GPU) 2011 and Graphics Memory 2015.

The components of computer system 2000 cooperatively operate to provide versatile functionality and performance. In one exemplary implementation, the components of computer system 2000 cooperatively operate to provide predetermined types of functionality. Communications bus 2091, 2092, 2093, 2094, 2095, and 2097 communicate information. Central processor 2001 processes information. Main memory 2002 stores information and instructions for the central processor 2001. Removable data storage device 2004 also stores information and instructions (e.g., functioning as a large information reservoir). Input device 2007 provides a mechanism for inputting information and/or for pointing to or highlighting information on display 2020. Signal communication port 2008 provides a communication interface to exterior devices (e.g., an interface with a network). Display device 2020 displays information in accordance with data stored in frame buffer 2015. Graphics processor 2011 processes graphics commands from central processor 2001 and provides the resulting data to graphics memory 2015 for storage and retrieval by display monitor 2020. Graphics memory 2015 can include storage for various memory operations (e.g., CPU cache operations, frame buffer operations, raster operations, rendering operations, etc.). Hybrid frustum trace processes can be utilized for various operations within computer system 2000 (e.g., for execution operations on CPU 2001, execution operations on GPU 2011, etc.).

Image information received from a camera or image sensor is separated into two parts or portions (e.g., see FIGS. 7A, 7B, 7C, etc.). One part of the image information is rearranged and compressed, then stored in a memory. The other part is stored in memory without being rearranged or compressed. In one exemplary implementation, part of original image values captured by a camera or sensor are compressed and stored as a base portion, and part of the original image values are not compressed and stored as an enhancement portion. The base portion values can be rearranged or reconfigured (e.g., FIGS. 11A, 11B, 12a, 12B, 13A, 13C, etc) to be compatible with efficient compression techniques. The storage of an uncompressed enhanced portion and a compressed base portion of the original image values enables efficient and effective lossless and accurate storage of information in less space than conventional systems. The rearrangement being compatible with efficient compression techniques enables the information to be compressed conveniently and faster than traditional approaches.

Some portions of the detailed descriptions are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical or quantum computing device) that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

References to "one embodiment" or "an embodiment" mean that one or more features, structures, characteristics, and so on, described in connection with the embodiment is included in at least one implementation encompassed by the present specification. Thus, appearances of the phrase "one embodiment" or "an embodiment" are not necessarily referring to the same embodiment. Furthermore, the features, structures, characteristics, and so on, may be included in other suitable forms other than the particular embodiment illustrated.

The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting. The use of the disjunctive is intended to include the conjunctive.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as suited to the particular use contemplated. It is intended that the scope of the invention be defined by the Claims appended hereto and their equivalents. The listing of steps within method claims do not imply any particular order to performing the steps, unless explicitly stated in the claim.

The invention claimed is:

1. A method comprising:
   receiving, from an image capture device, raw image data representative of pixel values expressed in a first color space;
   for at least one pixel value of the pixel values:
   segregating a first portion of the raw image data corresponding to the pixel value into a base layer portion and a second portion of the raw image data corresponding to the pixel value into an enhanced layer portion, the enhanced layer portion including at least a least significant bit corresponding to the pixel value;
   reconfiguring the base layer portion as a pseudo color space expression compatible with a compression format of a second color space different from the first color space; and
   compressing the pseudo color space expression according to the compression format to generate compressed data; and
   storing the compressed data and the enhanced layer portion as the pixel value.

2. The method of claim 1, wherein the reconfiguring the base layer portion as the pseudo color space expression comprises:
   separating the base layer portion into at least a first base layer portion corresponding to a first color element corresponding to a first color associated with the pixel value and a second base layer portion corresponding to a second color element corresponding to a second color associated with the pixel value;
   forming one or more base layer frames using at least the first base layer portion and the second base layer portion; and
   arranging information associated with the one or more base layer video frames into the pseudo color space expression.

3. The method of claim 1, wherein the raw image data is in a Red, Clear, Clear, Blue (RCCB) format and the reconfigured base layer portion includes red, clear, and blue components configured in the pseudo color space expression, wherein the pseudo color space expression is a pseudo YUV format comprising RCCB values in YUV slots of an image frame bit stream.

4. The method of claim 1, wherein a boundary separating bits in the base layer portion from bits in the enhancement layer portion is based upon a balancing of benefits of compressing the information versus the cost of compressing the information.

5. The method of claim 1, wherein the reconfiguring includes forming a base layer video frame.

6. The method of claim 1, wherein the base layer portion comprises more bits than the enhanced layer portion.

7. The method of claim 1, wherein the base layer portion includes the most significant bit corresponding to the pixel value.

8. The method of claim 1, wherein the reconfigured base layer information is input to at least one video encoder selected from a group of video encoders comprising: a H.264 compatible encoder, a H.265 compatible encoder, a VP9 compatible encoder, or an AV1 compatible encoder.

9. A method comprising:
receiving raw image data generated using an image capture device, wherein the raw image data represents pixel values expressed in a Red Clear Clear Blue (RCCB) color space;
segregating the pixel values into a base layer portion and an enhanced layer portion;
reconfiguring the base layer portion of the pixel values as a pseudo color expression, wherein the pseudo color space expression is compatible with a YUV color space compression compatible format, wherein the reconfiguring includes:
separating the base layer portion based upon multiple elements within the raw image data, wherein the multiple elements comprise two or more of a red element, a blue element, a first clear element, or a second clear element that correspond to the pixel values;
forming one or more base layer video frames from the multiple elements; and
arranging information associated with the one or more base layer video frames in the YUV color space compression compatible format using the pixel values expressed in the RCCB color space as values in the YUV color space compression compatible format; and
compressing the one or more base layer video frames, the one or more base layer video frames include the pseudo color space expression.

10. The method of claim 9, wherein the one or more base layer video frames comprise:
one or more Clear Blue (CB) video frames formed by the blue element and the first clear element; and
one or more Clear Red (CR) video frames formed by the red element and the second clear element.

11. The method of claim 9, wherein the one or more base layer video frames correspond to a pseudo YUV444 format.

12. The method of claim 9, wherein zero plane frames are utilized as pseudo UV components, and a portion of the one or more base layer video frames correspond to a pseudo Y component.

13. The method of claim 9, wherein the one or more base layer video frames correspond to a pseudo YUV420 format.

14. The method of claim 9, wherein the one or more base layer video frames are input to a video encoder selected from a group comprising an H.264 compatible encoder, an H.265 compatible encoder, an VP9 compatible encoder, or an AV1 compatible encoder.

15. The method of claim 9, wherein a first portion of the red element corresponds to a chrominance U input, a first portion of the blue element corresponds to a chrominance V input, and a second portion of the red element, a second portion of the blue element, the first clear element, and the second clear element correspond to a luminance Y input.

16. The method of claim 15, wherein the base layer video frames are compatible with a pseudo YUV420 format wherein:
a pseudo YUV width is equal to an input width; and
a pseudo YUV height is equal to (input_height+2)/3*2, wherein input_height is a value indicating the number of pixels in the input height of the pseudo YUV component.

17. The method of claim 15, further comprising training, based at least in part on the base layer portion and the enhanced layer portion, at least one of a deep learning network or a deep neural network (DNN) for use in autonomous machine applications.

18. A system comprising:
an image capture device that captures raw image data representative of at least a pixel value of pixel values expressed in a first color space;
one or more processing units that:
segregate a first portion of the raw image data corresponding to the pixel value into a base layer portion and a second portion of the raw image data corresponding to the pixel value into an enhanced layer portion;
reconfigure the base layer portion as a pseudo color space expression compatible with a compression format of a second color space different from the first color space; and
compress the pseudo color space expression according to the compression format to generate compressed data; and
one or more memory units that store a first portion of the pixel value as the compressed data and a second portion of the pixel value as the second portion of the raw image data corresponding to the pixel value in a non-compressed format.

19. The system of claim 18, wherein the enhancement portion includes a least significant bit corresponding to the pixel value and the base portion includes a most significant bit corresponding to the pixel value.

20. The system of claim 18, wherein the image capture device, the one or more processing units, and the one or more memory units are comprised in an autonomous machine, and the raw image data corresponds to scenes encountered during operation of the autonomous machine.

21. The system of claim 20, wherein at least one of the one or more memory units is portable and selectively removable from the autonomous machine.

* * * * *